(12) United States Patent
Quandt et al.

(10) Patent No.: US 8,214,778 B2
(45) Date of Patent: Jul. 3, 2012

(54) METHODS FOR CELL PHASING AND PLACEMENT IN DYNAMIC ARRAY ARCHITECTURE AND IMPLEMENTATION OF THE SAME

(75) Inventors: Jonathan R. Quandt, San Jose, CA (US); Scott T. Becker, Scotts Valley, CA (US); Dhrumil Gandhi, Cupertino, CA (US)

(73) Assignee: Tela Innovations, Inc., Los Gatos, CA (US)

( * ) Notice: Subject to any disclaimer, the term of this patent is extended or adjusted under 35 U.S.C. 154(b) by 394 days.

(21) Appl. No.: 12/497,052

(22) Filed: Jul. 2, 2009

(65) Prior Publication Data

US 2009/0271753 A1    Oct. 29, 2009

Related U.S. Application Data

(63) Continuation-in-part of application No. 12/013,342, filed on Jan. 11, 2008, now Pat. No. 7,917,879.

(60) Provisional application No. 61/081,370, filed on Jul. 16, 2008, provisional application No. 60/963,364, filed on Aug. 2, 2007, provisional application No. 60/972,394, filed on Sep. 14, 2007.

(51) Int. Cl.
*G06F 17/50*    (2006.01)
(52) U.S. Cl. ........ 716/100; 716/110; 716/119; 716/122; 716/123
(58) Field of Classification Search ........................ None
See application file for complete search history.

(56) References Cited

U.S. PATENT DOCUMENTS

| | | | |
|---|---|---|---|
| 4,197,555 A | 4/1980 | Uehara et al. |
| 4,417,161 A | 11/1983 | Uya |
| 4,424,460 A | 1/1984 | Best |
| 4,682,202 A | 7/1987 | Tanizawa |
| 4,801,986 A | 1/1989 | Chang et al. |
| 5,097,422 A | 3/1992 | Corbin et al. |
| 5,121,186 A | 6/1992 | Wong et al. |
| 5,208,765 A | 5/1993 | Turnbull |
| 5,224,057 A | 6/1993 | Igarashi |

(Continued)

FOREIGN PATENT DOCUMENTS

EP    1394858    3/2004

(Continued)

OTHER PUBLICATIONS

U.S. Appl. No. 60/625,342, filed May 25, 2006, Pileggi et al.

(Continued)

*Primary Examiner* — Leigh Garbowski
(74) *Attorney, Agent, or Firm* — Martine Penilla Group, LLP

(57) ABSTRACT

A semiconductor chip is defined to include a logic block area having a first chip level in which layout features are placed according to a first virtual grate, and a second chip level in which layout features are placed according to a second virtual grate. A rational spatial relationship exists between the first and second virtual grates. A number of cells are placed within the logic block area. Each of the number of cells is defined according to an appropriate one of a number of cell phases. The appropriate one of the number of cell phases causes layout features in the first and second chip levels of a given placed cell to be aligned with the first and second virtual grates as positioned within the given placed cell.

39 Claims, 17 Drawing Sheets

U.S. PATENT DOCUMENTS

| | | | |
|---|---|---|---|
| 5,242,770 A | 9/1993 | Chen et al. | |
| 5,378,649 A | 1/1995 | Huang | |
| 5,471,403 A | 11/1995 | Fujimaga | |
| 5,497,334 A | 3/1996 | Russell et al. | |
| 5,497,337 A | 3/1996 | Ponnapalli et al. | |
| 5,581,098 A | 12/1996 | Chang | |
| 5,636,002 A | 6/1997 | Garofalo | |
| 5,682,323 A | 10/1997 | Pasch et al. | |
| 5,684,733 A | 11/1997 | Wu et al. | |
| 5,705,301 A | 1/1998 | Garza et al. | |
| 5,723,883 A | 3/1998 | Gheewalla | |
| 5,740,068 A | 4/1998 | Liebmann et al. | |
| 5,745,374 A | 4/1998 | Matsumoto | |
| 5,774,367 A | 6/1998 | Reyes et al. | |
| 5,790,417 A | 8/1998 | Chao et al. | |
| 5,796,624 A | 8/1998 | Sridhar et al. | |
| 5,825,203 A | 10/1998 | Kusunoki et al. | |
| 5,838,594 A | 11/1998 | Kojima | |
| 5,841,663 A | 11/1998 | Sharma et al. | |
| 5,847,421 A | 12/1998 | Yamaguchi | |
| 5,852,562 A * | 12/1998 | Shinomiya et al. | 716/139 |
| 5,858,580 A | 1/1999 | Wang et al. | |
| 5,898,194 A | 4/1999 | Gheewala | |
| 5,900,340 A | 5/1999 | Reich et al. | |
| 5,908,827 A | 6/1999 | Sirna | |
| 5,923,059 A | 7/1999 | Gheewala | |
| 5,929,469 A | 7/1999 | Mimoto et al. | |
| 5,935,763 A | 8/1999 | Caterer et al. | |
| 5,973,507 A | 10/1999 | Yamazaki | |
| 5,977,305 A | 11/1999 | Wigler et al. | |
| 6,009,251 A | 12/1999 | Ho et al. | |
| 6,026,223 A | 2/2000 | Scepanovic et al. | |
| 6,037,617 A | 3/2000 | Kumagai | |
| 6,044,007 A | 3/2000 | Capodieci | |
| 6,063,132 A | 5/2000 | DeCamp et al. | |
| 6,084,437 A | 7/2000 | Sako | |
| 6,091,845 A | 7/2000 | Pierrat et al. | |
| 6,099,584 A | 8/2000 | Arnold et al. | |
| 6,100,025 A | 8/2000 | Wigler et al. | |
| 6,114,071 A | 9/2000 | Chen et al. | |
| 6,166,415 A | 12/2000 | Sakemi et al. | |
| 6,174,742 B1 | 1/2001 | Sudhindranath et al. | |
| 6,182,272 B1 | 1/2001 | Andreev et al. | |
| 6,194,104 B1 | 2/2001 | Hsu | |
| 6,194,252 B1 | 2/2001 | Yamaguchi | |
| 6,194,912 B1 | 2/2001 | Or-Bach | |
| 6,209,123 B1 | 3/2001 | Maziasz et al. | |
| 6,230,299 B1 | 5/2001 | McSherry et al. | |
| 6,232,173 B1 | 5/2001 | Hsu et al. | |
| 6,240,542 B1 | 5/2001 | Kapur | |
| 6,249,902 B1 | 6/2001 | Igusa et al. | |
| 6,255,600 B1 | 7/2001 | Schaper | |
| 6,262,487 B1 | 7/2001 | Igarashi et al. | |
| 6,269,472 B1 | 7/2001 | Garza et al. | |
| 6,275,973 B1 | 8/2001 | Wein | |
| 6,282,696 B1 | 8/2001 | Garza et al. | |
| 6,303,252 B1 | 10/2001 | Lin | |
| 6,331,733 B1 | 12/2001 | Or-Bach et al. | |
| 6,335,250 B1 | 1/2002 | Egi | |
| 6,338,972 B1 | 1/2002 | Sudhindranath et al. | |
| 6,356,112 B1 | 3/2002 | Tran et al. | |
| 6,370,679 B1 | 4/2002 | Chang et al. | |
| 6,378,110 B1 | 4/2002 | Ho | |
| 6,388,296 B1 | 5/2002 | Hsu | |
| 6,393,601 B1 | 5/2002 | Tanaka et al. | |
| 6,415,421 B2 | 7/2002 | Anderson et al. | |
| 6,416,907 B1 | 7/2002 | Winder et al. | |
| 6,421,820 B1 | 7/2002 | Mansfield et al. | |
| 6,425,112 B1 | 7/2002 | Bula et al. | |
| 6,425,117 B1 | 7/2002 | Pasch et al. | |
| 6,426,269 B1 | 7/2002 | Haffner et al. | |
| 6,436,805 B1 | 8/2002 | Trivedi | |
| 6,470,489 B1 | 10/2002 | Chang et al. | |
| 6,476,493 B2 | 11/2002 | Or-Bach et al. | |
| 6,477,695 B1 | 11/2002 | Gandhi | |
| 6,480,989 B2 | 11/2002 | Chan et al. | |
| 6,492,066 B1 | 12/2002 | Capodieci et al. | |
| 6,496,965 B1 | 12/2002 | van Ginneken et al. | |
| 6,505,327 B2 | 1/2003 | Lin | |
| 6,505,328 B1 | 1/2003 | van Ginneken et al. | |
| 6,509,952 B1 | 1/2003 | Govil et al. | |
| 6,514,849 B1 | 2/2003 | Hui et al. | |
| 6,516,459 B1 | 2/2003 | Sahouria | |
| 6,523,156 B2 | 2/2003 | Cirit | |
| 6,525,350 B1 | 2/2003 | Kinoshita et al. | |
| 6,536,028 B1 | 3/2003 | Katsioulas et al. | |
| 6,543,039 B1 | 4/2003 | Watanabe | |
| 6,553,544 B2 | 4/2003 | Tanaka et al. | |
| 6,553,559 B2 | 4/2003 | Liebmann et al. | |
| 6,571,140 B1 | 5/2003 | Wewalaarachchi | |
| 6,571,379 B2 | 5/2003 | Takayama | |
| 6,578,190 B2 | 6/2003 | Ferguson et al. | |
| 6,588,005 B1 | 7/2003 | Kobayashi et al. | |
| 6,590,289 B2 | 7/2003 | Shively | |
| 6,591,207 B2 | 7/2003 | Naya et al. | |
| 6,609,235 B2 | 8/2003 | Ramaswamy et al. | |
| 6,610,607 B1 | 8/2003 | Armbrust et al. | |
| 6,620,561 B2 | 9/2003 | Winder et al. | |
| 6,633,182 B2 | 10/2003 | Pileggi et al. | |
| 6,635,935 B2 | 10/2003 | Makino | |
| 6,643,831 B2 | 11/2003 | Chang et al. | |
| 6,650,014 B2 | 11/2003 | Kariyazaki | |
| 6,661,041 B2 | 12/2003 | Keeth | |
| 6,662,350 B2 | 12/2003 | Fried et al. | |
| 6,673,638 B1 | 1/2004 | Bendik et al. | |
| 6,687,895 B2 | 2/2004 | Zhang | |
| 6,691,297 B1 | 2/2004 | Misaka et al. | |
| 6,700,405 B1 | 3/2004 | Hirairi | |
| 6,703,170 B1 | 3/2004 | Pindo | |
| 6,714,903 B1 | 3/2004 | Chu et al. | |
| 6,732,338 B2 | 5/2004 | Crouse et al. | |
| 6,737,199 B1 | 5/2004 | Hsieh | |
| 6,737,347 B1 | 5/2004 | Houston et al. | |
| 6,745,372 B2 | 6/2004 | Cote et al. | |
| 6,745,380 B2 | 6/2004 | Bodendorf et al. | |
| 6,749,972 B2 | 6/2004 | Yu | |
| 6,760,269 B2 | 7/2004 | Nakase et al. | |
| 6,765,245 B2 | 7/2004 | Bansal | |
| 6,777,138 B2 | 8/2004 | Pierrat et al. | |
| 6,777,146 B1 | 8/2004 | Samuels | |
| 6,789,244 B1 | 9/2004 | Dasasathyan et al. | |
| 6,789,246 B1 | 9/2004 | Mohan et al. | |
| 6,792,593 B2 | 9/2004 | Takashima et al. | |
| 6,794,914 B2 | 9/2004 | Sani et al. | |
| 6,795,952 B1 | 9/2004 | Stine et al. | |
| 6,795,953 B2 | 9/2004 | Bakarian et al. | |
| 6,807,663 B2 | 10/2004 | Cote et al. | |
| 6,819,136 B2 | 11/2004 | Or-Bach | |
| 6,826,738 B2 | 11/2004 | Cadouri | |
| 6,834,375 B1 | 12/2004 | Stine et al. | |
| 6,841,880 B2 | 1/2005 | Matsumoto et al. | |
| 6,850,854 B2 | 2/2005 | Naya et al. | |
| 6,854,096 B2 | 2/2005 | Eaton et al. | |
| 6,854,100 B1 | 2/2005 | Chuang et al. | |
| 6,877,144 B1 | 4/2005 | Rittman et al. | |
| 6,884,712 B2 | 4/2005 | Yelehanka et al. | |
| 6,898,770 B2 | 5/2005 | Boluki et al. | |
| 6,904,582 B1 | 6/2005 | Rittman et al. | |
| 6,918,104 B2 | 7/2005 | Pierrat et al. | |
| 6,920,079 B2 | 7/2005 | Shibayama | |
| 6,928,635 B2 | 8/2005 | Pramanik et al. | |
| 6,931,617 B2 | 8/2005 | Sanie et al. | |
| 6,953,956 B2 | 10/2005 | Or-Bach et al. | |
| 6,954,918 B2 | 10/2005 | Houston | |
| 6,957,402 B2 | 10/2005 | Templeton et al. | |
| 6,968,527 B2 | 11/2005 | Pierrat | |
| 6,978,436 B2 | 12/2005 | Cote et al. | |
| 6,978,437 B1 | 12/2005 | Rittman et al. | |
| 6,992,394 B2 | 1/2006 | Park | |
| 6,992,925 B2 | 1/2006 | Peng | |
| 6,993,741 B2 | 1/2006 | Liebmann et al. | |
| 6,994,939 B1 | 2/2006 | Ghandehari et al. | |
| 7,016,214 B2 | 3/2006 | Kawamata | |
| 7,028,285 B2 * | 4/2006 | Cote et al. | 716/55 |
| 7,041,568 B2 | 5/2006 | Goldbach et al. | |
| 7,052,972 B2 | 5/2006 | Sandhu et al. | |
| 7,063,920 B2 | 6/2006 | Baba-Ali | |

| Patent No. | Date | Inventor |
|---|---|---|
| 7,064,068 B2 | 6/2006 | Chou et al. |
| 7,065,731 B2 | 6/2006 | Jacques et al. |
| 7,079,989 B2 | 7/2006 | Wimer |
| 7,093,208 B2 | 8/2006 | Williams et al. |
| 7,093,228 B2 | 8/2006 | Andreev et al. |
| 7,103,870 B2 | 9/2006 | Misaka et al. |
| 7,105,871 B2 | 9/2006 | Or-Bach et al. |
| 7,107,551 B1 | 9/2006 | de Dood et al. |
| 7,115,343 B2 | 10/2006 | Gordon et al. |
| 7,115,920 B2 | 10/2006 | Bernstein et al. |
| 7,120,882 B2 | 10/2006 | Kotani et al. |
| 7,124,386 B2 | 10/2006 | Smith et al. |
| 7,132,203 B2 | 11/2006 | Pierrat |
| 7,137,092 B2 | 11/2006 | Maeda |
| 7,149,999 B2 | 12/2006 | Kahng et al. |
| 7,152,215 B2 | 12/2006 | Smith et al. |
| 7,155,685 B2 | 12/2006 | Mori et al. |
| 7,155,689 B2 | 12/2006 | Pierrat |
| 7,159,197 B2 | 1/2007 | Falbo et al. |
| 7,174,520 B2 | 2/2007 | White et al. |
| 7,175,940 B2 | 2/2007 | Laidig et al. |
| 7,185,294 B2 | 2/2007 | Zhang |
| 7,188,322 B2 | 3/2007 | Cohn et al. |
| 7,194,712 B2 | 3/2007 | Wu |
| 7,200,835 B2 | 4/2007 | Zhang et al. |
| 7,202,517 B2 | 4/2007 | Dixit et al. |
| 7,219,326 B2 | 5/2007 | Reed et al. |
| 7,225,423 B2 | 5/2007 | Bhattacharya et al. |
| 7,227,183 B2 | 6/2007 | Donze et al. |
| 7,231,628 B2 | 6/2007 | Pack et al. |
| 7,235,424 B2 | 6/2007 | Chen et al. |
| 7,243,316 B2 | 7/2007 | White et al. |
| 7,252,909 B2 | 8/2007 | Shin et al. |
| 7,264,990 B2 | 9/2007 | Rueckes et al. |
| 7,278,118 B2 | 10/2007 | Pileggi et al. |
| 7,287,320 B2 | 10/2007 | Wang et al. |
| 7,294,534 B2 | 11/2007 | Iwaki |
| 7,302,651 B2 | 11/2007 | Allen et al. |
| 7,308,669 B2 | 12/2007 | Buehler et al. |
| 7,335,966 B2 | 2/2008 | Ihme et al. |
| 7,337,421 B2 | 2/2008 | Kamat |
| 7,338,896 B2 | 3/2008 | Vanhaelemeersch et al. |
| 7,346,885 B2 | 3/2008 | Semmler |
| 7,350,183 B2 | 3/2008 | Cui et al. |
| 7,353,492 B2 | 4/2008 | Gupta et al. |
| 7,360,179 B2 | 4/2008 | Smith et al. |
| 7,360,198 B2 | 4/2008 | Rana et al. |
| 7,366,997 B1 | 4/2008 | Rahmat |
| 7,367,008 B2 | 4/2008 | White et al. |
| 7,376,931 B2 | 5/2008 | Kokubun |
| 7,383,521 B2 | 6/2008 | Smith et al. |
| 7,397,260 B2 | 7/2008 | Chanda et al. |
| 7,400,627 B2 | 7/2008 | Wu et al. |
| 7,404,173 B2 | 7/2008 | Wu et al. |
| 7,411,252 B2 | 8/2008 | Anderson et al. |
| 7,421,678 B2 | 9/2008 | Barnes et al. |
| 7,423,298 B2 | 9/2008 | Mariyama et al. |
| 7,424,694 B2 | 9/2008 | Ikeda |
| 7,426,710 B2 | 9/2008 | Zhang et al. |
| 7,434,185 B2 | 10/2008 | Dooling et al. |
| 7,441,211 B1 | 10/2008 | Gupta et al. |
| 7,444,609 B2 | 10/2008 | Charlebois et al. |
| 7,446,352 B2 | 11/2008 | Becker et al. |
| 7,449,371 B2 | 11/2008 | Kemerling et al. |
| 7,458,045 B2 | 11/2008 | Cote et al. |
| 7,459,792 B2 | 12/2008 | Chen |
| 7,465,973 B2 | 12/2008 | Chang et al. |
| 7,466,607 B2 | 12/2008 | Hollis et al. |
| 7,480,880 B2 | 1/2009 | Visweswariah et al. |
| 7,480,891 B2 | 1/2009 | Sezginer |
| 7,484,197 B2 | 1/2009 | Allen et al. |
| 7,487,475 B1 | 2/2009 | Kriplani et al. |
| 7,506,300 B2 | 3/2009 | Sezginer et al. |
| 7,509,621 B2 | 3/2009 | Melvin, III |
| 7,509,622 B2 | 3/2009 | Sinha et al. |
| 7,512,921 B2 | 3/2009 | Shibuya |
| 7,514,959 B2 | 4/2009 | Or-Bach et al. |
| 7,523,429 B2 | 4/2009 | Kroyan et al. |
| 7,527,900 B2 | 5/2009 | Zhou et al. |
| 7,563,701 B2 | 7/2009 | Chang et al. |
| 7,568,174 B2 | 7/2009 | Sezginer et al. |
| 7,569,310 B2 | 8/2009 | Wallace et al. |
| 7,614,030 B2 | 11/2009 | Hsu |
| 7,632,610 B2 | 12/2009 | Wallace et al. |
| 7,665,051 B2 | 2/2010 | Ludwig et al. |
| 7,712,056 B2 | 5/2010 | White et al. |
| 7,770,144 B2 | 8/2010 | Dellinger |
| 7,802,219 B2 | 9/2010 | Tomar et al. |
| 7,825,437 B2 | 11/2010 | Pillarisetty et al. |
| 7,842,975 B2 | 11/2010 | Becker et al. |
| 7,882,456 B2 | 2/2011 | Zach |
| 7,888,705 B2 | 2/2011 | Becker et al. |
| 7,898,040 B2 | 3/2011 | Nawaz |
| 7,908,578 B2 | 3/2011 | Becker et al. |
| 7,910,958 B2 | 3/2011 | Becker et al. |
| 7,917,877 B2 | 3/2011 | Singh et al. |
| 7,917,879 B2 | 3/2011 | Becker et al. |
| 7,923,266 B2 | 4/2011 | Thijs et al. |
| 7,923,337 B2 | 4/2011 | Chang et al. |
| 7,932,545 B2 | 4/2011 | Becker et al. |
| 7,962,867 B2 | 6/2011 | White et al. |
| 7,964,267 B1 | 6/2011 | Lyons et al. |
| 7,971,160 B2 | 6/2011 | Osawa et al. |
| 7,992,122 B1 | 8/2011 | Burstein et al. |
| 7,994,583 B2 | 8/2011 | Inaba |
| 8,004,042 B2 | 8/2011 | Yang et al. |
| 8,058,671 B2 | 11/2011 | Becker et al. |
| 2002/0079927 A1 | 6/2002 | Katoh et al. |
| 2003/0042930 A1 | 3/2003 | Pileggi et al. |
| 2003/0046653 A1 | 3/2003 | Liu |
| 2003/0061592 A1 | 3/2003 | Agrawal et al. |
| 2003/0088839 A1 | 5/2003 | Watanabe |
| 2003/0088842 A1 | 5/2003 | Cirit |
| 2003/0106037 A1 | 6/2003 | Moniwa et al. |
| 2003/0145299 A1 | 7/2003 | Fried et al. |
| 2003/0177465 A1 | 9/2003 | MacLean et al. |
| 2003/0229868 A1 | 12/2003 | White et al. |
| 2003/0229875 A1 | 12/2003 | Smith et al. |
| 2004/0049754 A1 | 3/2004 | Liao et al. |
| 2004/0063038 A1 | 4/2004 | Shin et al. |
| 2004/0139412 A1 | 7/2004 | Ito et al. |
| 2004/0145028 A1 | 7/2004 | Matsumoto et al. |
| 2004/0153979 A1 | 8/2004 | Chang |
| 2004/0161878 A1 | 8/2004 | Or-Bach et al. |
| 2004/0229135 A1 | 11/2004 | Wang et al. |
| 2004/0243966 A1 | 12/2004 | Dellinger |
| 2005/0055828 A1 | 3/2005 | Wang et al. |
| 2005/0087806 A1 | 4/2005 | Hokazono |
| 2005/0093147 A1 | 5/2005 | Tu |
| 2005/0101112 A1 | 5/2005 | Rueckes et al. |
| 2005/0136340 A1 | 6/2005 | Baselmans et al. |
| 2005/0138598 A1 | 6/2005 | Kokubun |
| 2005/0185325 A1 | 8/2005 | Hur |
| 2005/0189614 A1 | 9/2005 | Ihme et al. |
| 2005/0196685 A1 | 9/2005 | Wang et al. |
| 2005/0224982 A1 | 10/2005 | Kemerling et al. |
| 2005/0229130 A1 | 10/2005 | Wu et al. |
| 2005/0251771 A1 | 11/2005 | Robles |
| 2005/0268256 A1 | 12/2005 | Tsai et al. |
| 2006/0063334 A1 | 3/2006 | Donze et al. |
| 2006/0070018 A1 | 3/2006 | Semmler |
| 2006/0084261 A1 | 4/2006 | Iwaki |
| 2006/0101370 A1 | 5/2006 | Cui et al. |
| 2006/0112355 A1 | 5/2006 | Pileggi et al. |
| 2006/0121715 A1 | 6/2006 | Chang et al. |
| 2006/0125024 A1 | 6/2006 | Ishigaki |
| 2006/0151810 A1 | 7/2006 | Ohshige |
| 2006/0158270 A1 | 7/2006 | Gibet et al. |
| 2006/0177744 A1 | 8/2006 | Bodendorf et al. |
| 2006/0181310 A1 | 8/2006 | Rhee |
| 2006/0197557 A1 | 9/2006 | Chung |
| 2006/0206854 A1 | 9/2006 | Barnes et al. |
| 2006/0223302 A1 | 10/2006 | Chang et al. |
| 2006/0248495 A1 | 11/2006 | Sezginer |
| 2007/0038973 A1 | 2/2007 | Li et al. |
| 2007/0074145 A1 | 3/2007 | Tanaka |
| 2007/0094634 A1 | 4/2007 | Seizginer et al. |
| 2007/0101305 A1 | 5/2007 | Smith et al. |

| | | |
|---|---|---|
| 2007/0105023 A1 | 5/2007 | Zhou et al. |
| 2007/0106971 A1 | 5/2007 | Lien et al. |
| 2007/0113216 A1 | 5/2007 | Zhang |
| 2007/0209029 A1 | 9/2007 | Ivonin et al. |
| 2007/0210391 A1 | 9/2007 | Becker |
| 2007/0234252 A1 | 10/2007 | Visweswariah et al. |
| 2007/0256039 A1 | 11/2007 | White |
| 2007/0274140 A1 | 11/2007 | Joshi et al. |
| 2007/0290361 A1 | 12/2007 | Chen |
| 2007/0294652 A1 | 12/2007 | Bowen |
| 2008/0005712 A1 | 1/2008 | Charlebois et al. |
| 2008/0046846 A1 | 2/2008 | Chew et al. |
| 2008/0082952 A1 | 4/2008 | O'Brien |
| 2008/0086712 A1 | 4/2008 | Fujimoto |
| 2008/0097641 A1 | 4/2008 | Miyashita et al. |
| 2008/0098334 A1 | 4/2008 | Pileggi et al. |
| 2008/0099795 A1 | 5/2008 | Bernstein et al. |
| 2008/0127029 A1 | 5/2008 | Graur et al. |
| 2008/0144361 A1 | 6/2008 | Wong |
| 2008/0148216 A1 | 6/2008 | Chan et al. |
| 2008/0163141 A1 | 7/2008 | Scheffer et al. |
| 2008/0168406 A1 | 7/2008 | Rahmat et al. |
| 2008/0216207 A1 | 9/2008 | Tsai |
| 2008/0244494 A1 | 10/2008 | McCullen |
| 2008/0276105 A1 | 11/2008 | Hoberman et al. |
| 2008/0283910 A1 | 11/2008 | Dreeskornfeld et al. |
| 2008/0308848 A1 | 12/2008 | Inaba |
| 2009/0014811 A1 | 1/2009 | Becker |
| 2009/0024974 A1 | 1/2009 | Yamada |
| 2009/0031261 A1 | 1/2009 | Smith et al. |
| 2009/0032898 A1 | 2/2009 | Becker |
| 2009/0032967 A1 | 2/2009 | Becker |
| 2009/0037864 A1 | 2/2009 | Becker |
| 2009/0077524 A1 | 3/2009 | Nagamura |
| 2009/0101940 A1 | 4/2009 | Barrows et al. |
| 2009/0106714 A1 | 4/2009 | Culp et al. |
| 2009/0155990 A1 | 6/2009 | Yanagidaira et al. |
| 2009/0181314 A1 | 7/2009 | Shyu et al. |
| 2009/0187871 A1 | 7/2009 | Cork |
| 2009/0224408 A1 | 9/2009 | Fox |
| 2009/0228853 A1 | 9/2009 | Hong et al. |
| 2009/0280582 A1 | 11/2009 | Thijs et al. |
| 2009/0302372 A1 | 12/2009 | Chang et al. |
| 2010/0001321 A1 | 1/2010 | Becker |
| 2010/0006897 A1 | 1/2010 | Becker |
| 2010/0006898 A1 | 1/2010 | Becker |
| 2010/0006899 A1 | 1/2010 | Becker |
| 2010/0006900 A1 | 1/2010 | Becker |
| 2010/0006901 A1 | 1/2010 | Becker |
| 2010/0006902 A1 | 1/2010 | Becker |
| 2010/0006903 A1 | 1/2010 | Becker |
| 2010/0006947 A1 | 1/2010 | Becker |
| 2010/0006948 A1 | 1/2010 | Becker |
| 2010/0006950 A1 | 1/2010 | Becker |
| 2010/0006951 A1 | 1/2010 | Becker |
| 2010/0006986 A1 | 1/2010 | Becker |
| 2010/0011327 A1 | 1/2010 | Becker |
| 2010/0011328 A1 | 1/2010 | Becker |
| 2010/0011329 A1 | 1/2010 | Becker |
| 2010/0011330 A1 | 1/2010 | Becker |
| 2010/0011331 A1 | 1/2010 | Becker |
| 2010/0011332 A1 | 1/2010 | Becker |
| 2010/0011333 A1 | 1/2010 | Becker |
| 2010/0012981 A1 | 1/2010 | Becker |
| 2010/0012982 A1 | 1/2010 | Becker |
| 2010/0012983 A1 | 1/2010 | Becker |
| 2010/0012984 A1 | 1/2010 | Becker |
| 2010/0012985 A1 | 1/2010 | Becker |
| 2010/0012986 A1 | 1/2010 | Becker |
| 2010/0017766 A1 | 1/2010 | Becker |
| 2010/0017767 A1 | 1/2010 | Becker |
| 2010/0017768 A1 | 1/2010 | Becker |
| 2010/0017769 A1 | 1/2010 | Becker |
| 2010/0017770 A1 | 1/2010 | Becker |
| 2010/0017771 A1 | 1/2010 | Becker |
| 2010/0017772 A1 | 1/2010 | Becker |
| 2010/0019280 A1 | 1/2010 | Becker |
| 2010/0019281 A1 | 1/2010 | Becker |
| 2010/0019282 A1 | 1/2010 | Becker |
| 2010/0019283 A1 | 1/2010 | Becker |
| 2010/0019284 A1 | 1/2010 | Becker |
| 2010/0019285 A1 | 1/2010 | Becker |
| 2010/0019286 A1 | 1/2010 | Becker |
| 2010/0019287 A1 | 1/2010 | Becker |
| 2010/0019288 A1 | 1/2010 | Becker |
| 2010/0019308 A1 | 1/2010 | Chan et al. |
| 2010/0023906 A1 | 1/2010 | Becker |
| 2010/0023907 A1 | 1/2010 | Becker |
| 2010/0023908 A1 | 1/2010 | Becker |
| 2010/0023911 A1 | 1/2010 | Becker |
| 2010/0025731 A1 | 2/2010 | Becker |
| 2010/0025732 A1 | 2/2010 | Becker |
| 2010/0025733 A1 | 2/2010 | Becker |
| 2010/0025734 A1 | 2/2010 | Becker |
| 2010/0025735 A1 | 2/2010 | Becker |
| 2010/0025736 A1 | 2/2010 | Becker |
| 2010/0032721 A1 | 2/2010 | Becker |
| 2010/0032722 A1 | 2/2010 | Becker |
| 2010/0032723 A1 | 2/2010 | Becker |
| 2010/0032724 A1 | 2/2010 | Becker |
| 2010/0032726 A1 | 2/2010 | Becker |
| 2010/0037194 A1 | 2/2010 | Becker |
| 2010/0037195 A1 | 2/2010 | Becker |
| 2010/0096671 A1 | 4/2010 | Becker |
| 2010/0203689 A1 | 8/2010 | Bernstein et al. |
| 2010/0232212 A1 | 9/2010 | Anderson et al. |
| 2010/0264468 A1 | 10/2010 | Xu |
| 2010/0287518 A1 | 11/2010 | Becker |
| 2011/0108890 A1 | 5/2011 | Becker et al. |
| 2011/0108891 A1 | 5/2011 | Becker et al. |
| 2011/0154281 A1 | 6/2011 | Zach |
| 2011/0207298 A1 | 8/2011 | Anderson et al. |
| 2011/0260253 A1 | 10/2011 | Inaba |
| 2012/0012932 A1 | 1/2012 | Perng et al. |

FOREIGN PATENT DOCUMENTS

| | | |
|---|---|---|
| EP | 1670062 | 6/2006 |
| FR | 2860920 | 4/2005 |
| JP | 10-116911 | 5/1998 |
| JP | 2002-258463 | 9/2002 |
| JP | 2005-259913 | 9/2005 |
| KR | 10-1999-0057943 A | 7/1999 |
| KR | 10-2000-0028830 A | 5/2000 |
| KR | 10-2005-0030347 A | 3/2005 |
| WO | WO 2005/104356 | 11/2005 |
| WO | WO 2006/014849 | 2/2006 |
| WO | WO 2006/052738 | 5/2006 |
| WO | WO 2007/103587 | 9/2007 |

OTHER PUBLICATIONS

Acar, et al., "A Linear-Centric Simulation Framework for Parametric Fluctuations", 2002, IEEE, Carnegie Mellon University USA, pp. 1-8.

Amazawa, et al., "Fully Planarized Four-Level Interconnection with Stacked VLAS Using CMP of Selective CVD-Al and Insulator and its Application to Quarter Micron Gate Array LSIs", 1995, IEEE, Japan, pp. 473-476.

Axelrad et al. "Efficient Full-Chip Yield Analysis Methodology for OPC-Corrected VLSI Design", 2000, International Symposium on Quality Electronic Design (ISQED).

Balasinski et al. "Impact of Subwavelength CD Tolerance on Device Performance", 2002, SPIE.

Burkhardt, et al., "Dark Field Double Dipole Lithography (DDL) for Back-End-of-Line Processes", 2007, SPIE Proceeding Series, vol. 6520; 65200K.

Capetti, et al., "Sub k1 = 0.25 Lithography with Double Patterning Technique for 45nm Technology Node Flash Memory Devices at λ = 193nm", 2007, SPIE Proceeding Series, vol. 6520; 65202K.

Chandra, et al., "An Interconnect Channel Design Methodology for High Performance Integrated Circuits", 2004, IEEE, Carnegie Mellon University, pp. 1-6.

Cheng, et al., "Feasibility Study of Splitting Pitch Technology on 45nm Contact Patterning with 0.93 NA", 2007, SPIE Proceeding Series, vol. 6520; 65202N.

Chow, et al., "The Design of a SRAM-Based Field-Programmable Gate Array—Part II: Circuit Design and Layout", 1999, IEEE, vol. 7 # 3 pp. 321-330.

Clark et al. "Managing Standby and Active Mode Leakage Power in Deep Sub-Micron Design", Aug. 9-11, 2004, ACM.

Cobb et al. "Using OPC to Optimize for Image Slope and Improve Process Window", 2003, SPIE.

Devgan "Leakage Issues in IC Design: Part 3", 2003, CCAD.

DeVor, et al., "Statistical Quality Design and Control", 1992, Macmillan Publishing Company, pp. 264-267.

Dusa, et al. "Pitch Doubling Through Dual Patterning Lithography Challenges in Integration and Litho Budgets", 2007, SPIE Proceeding Series, vol. 6520; 65200G.

El-Gamal, "Fast, Cheap and Under Control: The Next Implementation Fabric", Jun. 2-6, 2003, ACM Press, pp. 354-355.

Frankel, "Quantum State Control Interference Lithography and Trim Double Patterning for 32-16nm Lithography", 2007, SPIE Proceeding Series, vol. 6520; 65202L.

Garg, et al. "Lithography Driven Layout Design", 2005, IEEE.

Grobman et al. "Reticle Enhancement Technology Trends: Resource and Manufacturability Implications for the Implementation of Physical Designs" Apr. 1-4, 2001, ACM.

Grobman et al. "Reticle Enhancement Technology: Implications and Challenges for Physical Design" Jun. 18-22, 2001, ACM.

Gupta et al. "Enhanced Resist and Etch CD Control by Design Perturbation", Oct. 4-7, 2006, Society of Photo-Optical Instrumentation Engineers.

Gupta et al. "A Practical Transistor-Level Dual Threshold Voltage Assignment Methodology", 2005, Sixth International Symposium on Quality Electronic Design (ISQED).

Gupta et al. "Detailed Placement for Improved Depth of Focus and CD Control", 2005, ACM.

Gupta et al. "Joining the Design and Mask Flows for Better and Cheaper Masks", Oct. 14-17, 2004, Society of Photo-Optical Instrumentation Engineers.

Gupta et al. "Selective Gate-Length Biasing for Cost-Effective Runtime Leakage Control", Jun. 7-11, 2004, ACM.

Gupta et al. "Wafer Topography-Aware Optical Proximity Correction for Better DOF Margin and CD Control", Apr. 13-15, 2005, SPIE.

Hayashida, et al., "Manufacturable Local Interconnect technology Fully Compatible with Titanium Salicide Process", Jun. 11-12, 1991, VMIC Conference.

Heng, et al., "A VLSI Artwork Legalization Technique Base on a New Criterion of Minimum Layout Perturbation", 1997, ACM Press, pp. 116-121.

Heng, et al., "Toward Through-Process Layout Quality Metrics", Mar. 3-4 2005, Society of Photo-Optical Instrumentation Engineers.

Hu, et al., "Synthesis and Placement Flow for Gain-Based Programmable Regular Fabrics", Apr. 6-9, 2003, ACM Press, pp. 197-203.

Hutton, et al., "A Methodology for FPGA to Structured-ASIC Synthesis and Verification", 2006, EDAA, pp. 64-69.

INTEL Core Microarchitecture White Paper "Introducing the 45 nm Next-Generation Intel Core Microarchitecture," 2007, Intel Corporation.

Jayakumar, et al., "A Metal and VIA Maskset Programmable VLSI Design Methodology using PLAs", 2004, IEEE, pp. 590-594.

Jhaveri, T. et al., Maximization of Layout Printability/Manufacturability by Extreme Layout Regularity, Proc. of the SPIE, Apr. 2006.

Kang, S.M., Metal-Metal Matrix (M3) for High-Speed MOS VLSI Layout, IEEE Trans. on CAD, vol. CAD-6, No. 5, Sep. 1987.

Kheterpal, et al., "Design Methodology for IC Manufacturability Based on Regular Logic-Bricks", DAC, Jun. 13-17, 2005, IEEE/AMC, vol. 6520.

Kheterpal, et al., "Routing Architecture Exploration for Regular Fabrics", DAC, Jun. 7-11, 2004, ACM Press, pp. 204-207.

Kim, et al., "Double Exposure Using 193nm Negative Tone Photoresist", 2007, SPIE Proceeding Series, vol. 6520; 65202M.

Kim, et al., "Issues and Challenges of Double Patterning Lithography in DRAM", 2007, SPIE Proceeding Series, vol. 6520; 65200H.

Koorapaty, et al., "Exploring Logic Block Granularity for Regular Fabrics", 2004, IEEE, pp. 1-6.

Koorapaty, et al., "Heterogeneous Logic Block Architectures for Via-Patterned Programmable Fabric", 13th International Conference on Field Programmable Logic and Applications (FPL) 2003, Lecture Notes in Computer Science (LNCS), Sep. 2003, Springer-Verlag, vol. 2778, pp. 426-436.

Koorapaty, et al., "Modular, Fabric-Specific Synthesis for Programmable Architectures", 12th International Conference on Field Programmable Logic and Applications (FPL_2002, Lecture Notes in Computer Science (LNCS)), Sep. 2002, Springer-Verlag, vol. 2438 pp. 132-141.

Lavin et al. "Backend DAC Flows for "Restrictive Design Rules"", 2004, IEEE.

Li, et al., "A Linear-Centric Modeling Approach to Harmonic Balance Analysis", 2002, IEEE, pp. 1-6.

Li, et al., "Nonlinear Distortion Analysis Via Linear-Centric Models", 2003, IEEE, pp. 897-903.

Liebmann et al., "Integrating DfM Components Into a Cohesive Design-To-Silicon Solution", IBM Systems and Technology Group, b IBM Research, pp. 1-12.

Liebmann, et al., "High-Perfoiniance Circuit Design for the RET-Enabled 65nm Technology Node", Feb. 26-27, 2004, SPIE Proceeding Series, vol. 5379 pp. 20-29.

Liebmann, L. W., Layout Impact of Resolution Enhancement Techniques: Impediment or Opportunity?, International Symposium on Physical Design, 2003.

Liu, et al., "Double Patterning with Multilayer Hard Mask Shrinkage for Sub-0.25 k1 Lithography", 200, SPIE Proceeding Series, vol. 6520; 65202J.

Miller, "Manufacturing-Aware Design Helps Boost IC Yield", Sep. 9, 2004, http://www.eetimes.com/showArticle.jhtml?articleID-47102054.

Mo, et al., "Checkerboard: A Regular Structure and its Synthesis, International Workshop on Logic and Synthesis", 2003, Department of Electrical Engineering and Computer Sciences, UC Berkeley, California, pp. 1-7.

Mo, et al., "PLA-Based Regular Structures and Their Synthesis", 2003, Department of Electrical Engineering and Computer Sciences, IEEE, pp. 723-729.

Mo, et al., "Regular Fabrics in Deep Sub-Micron Integrated-Circuit Design", 2004, Kluwer Academic Publishers, Entire Book.

Moore, Samuel K., "Intel 45-nanometer Penryn Processors Arrive," Nov. 13, 2007, IEEE Spectrum, http://spectrum.ieee.org/semiconductors/design/intel-45nanometer-penryn-processors-arrive.

Mutoh et al. "1-V Power Supply High-Speed Digital Circuit Technology with Multithreshold-Voltage CMOS", 1995, IEEE.

Op de Beek, et al., "Manufacturability issues with Double Patterning for 50nm half pitch damascene applications, using RELACS® shrink and corresponding OPC", 2007, SPIE Proceeding Series, vol. 6520; 65200I.

Or-Bach, "Programmable Circuit Fabrics", Sep. 18, 2001, e-ASIC, pp. 1-36.

Otten, et al., "Planning for Performance", DAC 1998, ACM Inc., pp. 122-127.

Pack et al. "Physical & Timing Verification of Subwavelength-Scale Designs-Part I: Lithography Impact on MOSFETs", 2003, SPIE.

Pandini, et al., "Congestion-Aware Logic Synthesis", 2002, IEEE, pp. 1-8.

Pandini, et al., "Understanding and Addressing the Impact of Wiring Congestion During Technology Mapping", ISPD Apr. 7-10, 2002, ACM Press, pp. 131-136.

Patel, et al., "An Architectural Exploration of Via Patterned Gate Arrays, ISPD 2003", Apr. 6, 2003, pp. 184-189.

Pileggi, et al., "Exploring Regular Fabrics to Optimize the Performance-Cost Trade-Offs, Proceedings of the 40th ACM/IEEE Design Automation Conference (DAC) 2003", Jun. 2003, ACM Press, pp. 782-787.

Poonawala, et al., "ILT for Double Exposure Lithography with Conventional and Novel Materials", 2007, SPIE Proceeding Series, vol. 6520; 65202Q.

Qian et al. "Advanced Physical Models for Mask Data Verification and Impacts on Physical Layout Synthesis" 2003. IEEE.

Ran, et al., "An Integrated Design Flow for a Via-Configurable Gate Array", 2004, IEEE, pp. 582-589.

Ran, et al., "Designing a Via-Configurable Regular Fabric", Custom Integrated Circuits Conference (CICC). Proceedings of the IEEE, Oct. 2004, Oct. 1, 2004, pp. 423-426.
Ran, et al., "On Designing Via-Configurable Cell Blocks for Regular Fabrics" Proceedings of the Design Automation Conference (DAC) 2004, Jun. 2004, ACM Press, s 198-203.
Ran, et al., "The Magic of a Via-Configurable Regular Fabric", Proceedings of the IEEE International Conference on Computer Design (ICCD) Oct. 2004.
Ran, et al., "Via-Configurable Routing Architectures and Fast Design Mappability Estimation for Regular Fabrics", 2005, IEEE, pp. 25-32.
Reis, et al., "Physical Design Methodologies for Performance Predictability and Manufacturability", Apr. 14-16, 2004, ACM Press, pp. 390-397.
Robertson, et al., "The Modeling of Double Patterning Lithographic Processes", 2007, SPIE Proceeding Series, vol. 6520; 65200J.
Rovner, "Design for Manufacturability in Via Programmable Gate Arrays", May 2003, Graduate School of Carnegie Mellon University.
Sengupta, "An Integrated CAD Framework Linking VLSI Layout Editors and Process Simulators", 1998, Thesis for Rice University, pp. 1-101.
Sengupta, et al., "An Integrated CAD Framework Linking VLSI Layout Editors and Process Simulators", 1996, SPIE Proceeding Series, vol. 2726; pp. 244-252.
Sherlekar, "Design Considerations for Regular Fabrics", Apr. 18-21, 2004, ACM Press, pp. 97-102.
Sreedhar et al. "Statistical Yield Modeling for Sub-Wavelength Lithography", 2008, IEEE.
Stapper, "Modeling of Defects in Integrated Circuit Photolithographic Patterns", Jul. 1, 1984, IBM, vol. 28 # 4, pp. 461-475.
Taylor, et al., "Enabling Energy Efficiency in Via-Patterned Gate Array Devices", Jun. 7-11, 2004, ACM Press, pp. 874-877.
Tian et al. "Model-Based Dummy Feature Placement for Oxide ChHemical_Mechanical Polishing Manufacturability" 2000, ACM.
Tong, et al., "Regular Logic Fabrics for a Via Patterned Gate Array (VPGA), Custom Integrated Circuits Conference", Sep. 2003, Proceedings of the IEEE, pp. 53-56.
Vanleenhove, et al., "A Litho-Only Approach to Double Patterning", 2007, SPIE Proceeding Series, vol. 6520; 65202F.
Wang, et al., "Performance Optimization for Gridded-Layout Standard Cells", 2004, vol. 5567 SPIE.
Wang, J. et al., Standard Cell Layout with Regular Contact Placement, IEEE Trans. on Semicon. Mfg., vol. 17, No. 3, Aug. 2004.
Webb, Clair, "Layout Rule Trends and Affect upon CPU Design", 2006, vol. 6156 SPIE.
Webb, Clair, "45nm Design for Manufacturing," Intel Technology Journal, vol. 12, Issue 02, Jun. 17, 2008, ISSN 1535-864X, pp. 121-130.
Wenren, et al., "The Improvement of Photolithographic Fidelity of Two-dimensional Structures Though Double Exposure Method", 2007, SPIE Proceeding Series, vol. 6520; 652021.
Wilcox, et al., "Design for Manufacturability: A Key to Semiconductor Manufacturing Excellence", 1998, IEEE, pp. 308-313.
Wu, et al., "A Study of Process Window Capabilities for Two-dimensional Structures under Double Exposure Condition", 2007, SPIE Proceeding Series, vol. 6520; 65202O.
Xiong, et al., "The Constrained Via Minimization Problem for PCB and VLSI Design", 1988, ACM Press/IEEE, pp. 573-578.
Yamamaoto, et al., "New Double Exposure Technique without Alternating Phase Shift Mask", 2007, SPIE Proceeding Series, vol. 6520; 652052P.
Yang, et al., "Interconnection Driven VLSI Module Placement Based on Quadratic Programming and Considering Congestion Using LFF Principles", 2004, IEEE, pp. 1243-1247.
Yao, et al., "Multilevel Routing With Redundant Via Insertion", Oct. 2006, IEEE, pp. 1148-1152.
Zheng, et al."Modeling and Analysis of Regular Symmetrically Structured Power/Ground Distribution Networks", DAC, Jun. 10-14, 2002, ACM Press, pp. 395-398.
Zhu, et al., "A Stochastic Integral Equation Method for Modeling the Rough Surface Effect on Interconnect Capacitance", 2004, IEEE.
Zhu, et al., "A Study of Double Exposure Process Design with Balanced Perfoimance Parameters for Line/Space Applications", 2007, SPIE Proceeding Series, vol. 6520; 65202H.
Zuchowski, et al., "A Hybrid ASIC and FPGA Architecture", 2003, IEEE, pp. 187-194.
Capodieci, L., et al., "Toward a Methodology for Manufacturability-Driven Design Rule Exploration," DAC 2004, Jun. 7-11, 2004, San Diego, CA.
Dictionary.com, "channel," in Collins English Dictionary—Complete & Unabridged 10th Edition. Source location: HarperCollins Publishers. http://dictionary.reference.com/browse/channel. Available: http://dictionary.reference.com.
Gupta et al. "Manufacturing-Aware Physical Design", 2003, ACM.
Gupta, Puneet, et al., "Manufacturing-aware Design Methodology for Assist Feature Correctness," 2005.
Ha et al., "Reduction in the Mask Error Factor by Optimizing the Diffraction Order of a Scattering Bar in Lithography," Journal of the Korean Physical Society, vol. 46, No. 5, May 2005, pp. 1213-1217.
Halpin et al., "Detailed Placement with Net Length Constraints," Publication Year 2003, Proceedings of the 3rd IEEE International Workshop on System-on-Chip for Real-Time Applications, pp. 22-27.
Hur et al., "Mongrel: Hybrid Techniques for Standard Cell Placement," Publication Year 2000, IEEE/ACM International Conference on Computer Aided Design, ICCAD-2000, pp. 165-170.
Kuh et al., "Recent Advances in VLSI Layout," Publication Year 1990, Proceedings of the IEEE, vol. 78, Issue 2, pp. 237-263.
Liebmann et al., "Optimizing Style Options for Sub-Resolution Assist Features," Proc. of SPIE vol. 4346, 2001, pp. 141-152.
Mansfield et al., "Lithographic Comparison of Assist Feature Design Strategies," Proc. of SPIE vol. 4000, 2000, pp. 63-76.
Mishra, P., et al., "FinFET Circuit Design," Nanoelectronic Circuit Design, pp. 23-54, 2011.
Pham, D., et al., "FINFET Device Junction Formation Challenges," 2006 International Workshop on Junction Technology, pp. 73-77, Aug. 2006.
Shi et al., "Understanding the Forbidden Pitch and Assist Feature Placement," Proc. of SPIE vol. 4562, 2002, pp. 968-979.
Smayling et al., "APF Pitch Halving for 22 nm Logic Cells Using Gridded Design Rules," Proceedings of SPIE, USA, vol. 6925, Jan. 1, 2008, pp. 69251E-1-69251E-7.
Firedberg, et al., "Modeling Within-Field Gate Length Spatial Variation for Process-Design Co-Optimization," 2005 Proc. of SPIE vol. 5756, pp. 178-188.
Hakko, et al., "Extension of the 2D-TCC Technique to Optimize Mask Pattern Layouts," 2008 Proc. of SPIE vol. 7028, 11 pages.
Kawashima, et al., "Mask Optimization for Arbitrary Patterns with 2D-TCC Resolution Enhancement Technique," 2008 Proc. of SPIE vol. 6924, 12 pages.
Rosenbluth, et al., "Optimum Mask and Source Patterns to Print a Given Shape," 2001 Proc. of SPIE vol. 4346, pp. 486-502.
Socha, et al., "Simultaneous Source Mask Optimization (SMO)," 2005 Proc. of SPIE vol. 5853, pp. 180-193.
Wong, et al., "Resolution Enhancement Techniques and Design for Manufacturability: Containing and Accounting for Variabilities in Integrated Circuit Creation," J. Micro/Nanolith. MEMS MOEMS, Jul.-Sep. 2007, vol. 6(3), 2 pages.
Yamazoe, et al., "Resolution Enhancement by Aerial Image Approximation with 2D-TCC," 2007 Proc. of SPIE vol. 6730, 12 pages.
Yu, et al., "True Process Variation Aware Optical Proximity Correction with Variational Lithography Modeling and Model Calibration," J. Micro/Nanolith. MEMS MOEMS, Jul.-Sep. 2007, vol. 6(3), 16 pages.

* cited by examiner

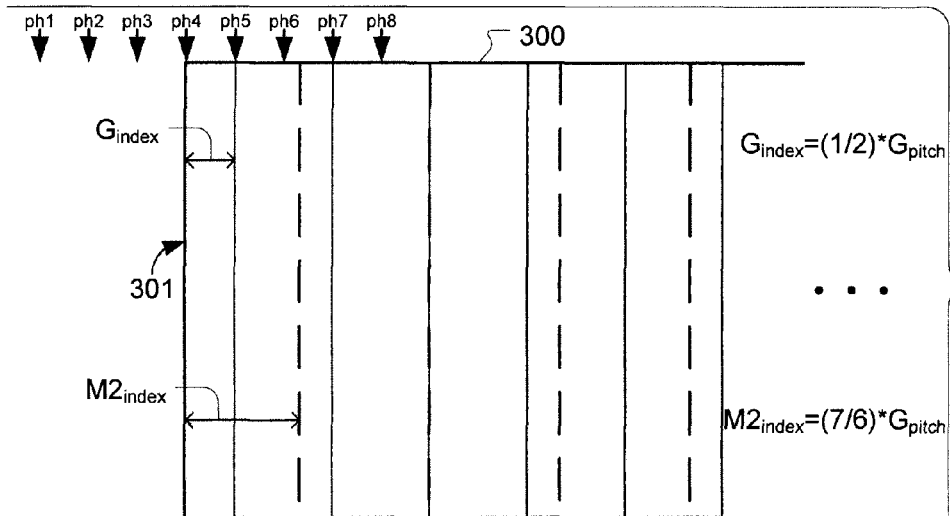
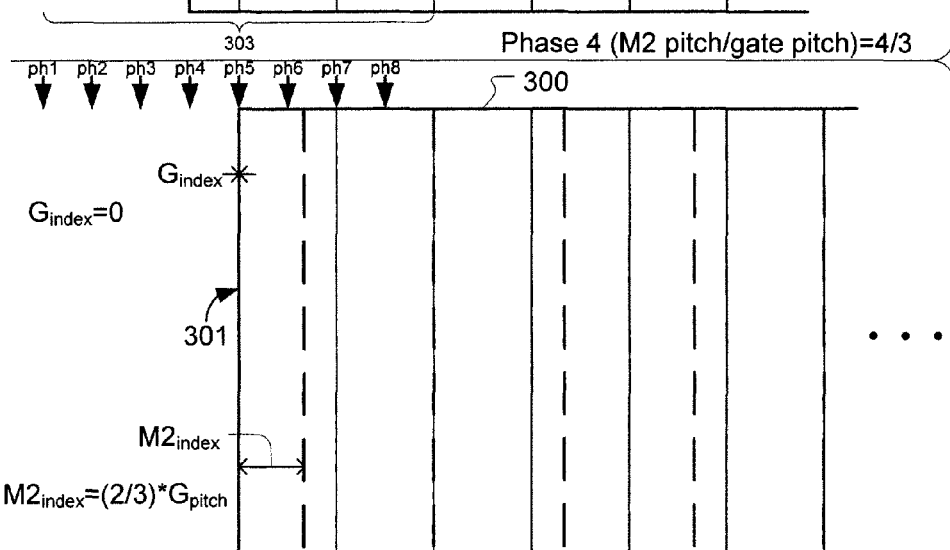
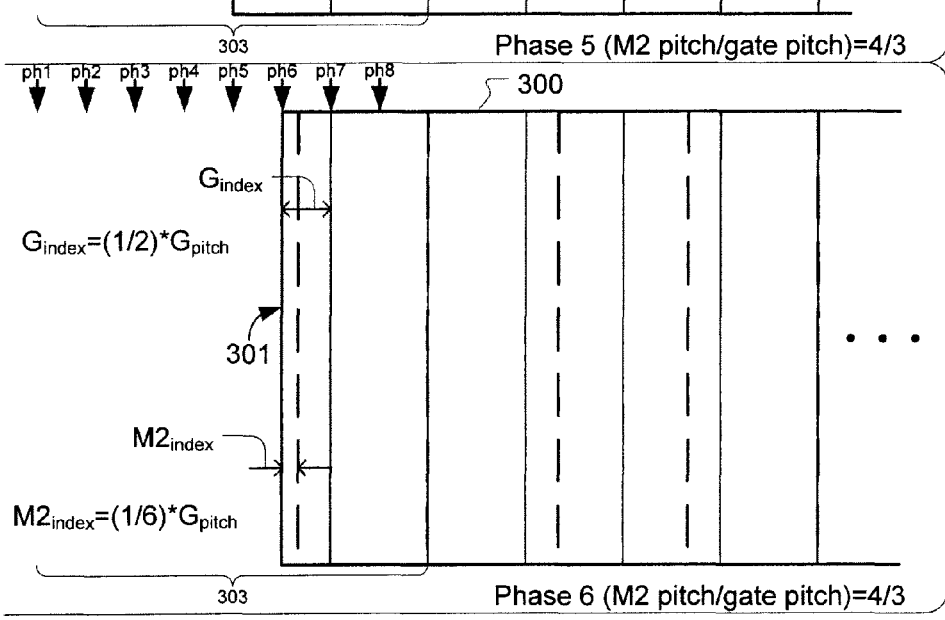

METHODS FOR CELL PHASING AND PLACEMENT IN DYNAMIC ARRAY ARCHITECTURE AND IMPLEMENTATION OF THE SAME

CLAIM OF PRIORITY

This application claims priority under 35 U.S.C. 119(e) to U.S. Provisional Patent Application No. 61/081,370, filed Jul. 16, 2008, entitled "Methods for Cell Phasing and Placement in Dynamic Array Architecture and Implementation of the Same." This application is also a continuation-in-part application under 35 U.S.C. 120 of U.S. application Ser. No. 12/013,342, filed on Jan. 11, 2008, now U.S. Pat. No. 7,917,879 which claims the benefit of both U.S. Provisional Patent Application No. 60/963,364, filed on Aug. 2, 2007, and U.S. Provisional Patent Application No. 60/972,394, filed on Sep. 14, 2007. The disclosure of each above-identified patent application is incorporated herein by reference.

CROSS-REFERENCE TO RELATED APPLICATIONS

This application is also related to U.S. patent application Ser. No. 11/683,402, filed on Mar. 7, 2007, and entitled "Dynamic Array Architecture." This application is also related to U.S. patent application Ser. No. 12/013,356, filed on Jan. 11, 2008, and entitled "Methods for Designing Semiconductor Device with Dynamic Array Section." This application is also related to U.S. patent application Ser. No. 12/013,366, filed on Jan. 11, 2008, and entitled "Methods for Defining Dynamic Array Section with Manufacturing Assurance Halo and Apparatus Implementing the Same." The disclosures of the above-identified patent applications are incorporated herein by reference.

BACKGROUND

In modern semiconductor chip ("chip") design, standard cells are placed on the chip to define a particular logic function. To ensure that each standard cell will be manufacturable when arbitrarily placed on the chip, each standard cell is defined to have an edge exclusion zone sized equal to one-half of a design rule (DR) spacing requirement between adjacent conductive features. In this manner, when any two standard cells are placed next to each other, their combined exclusion zone sizes at their interfacing boundaries will equal at least the DR spacing requirement between adjacent conductive features. Thus, the exclusion zone enables features to be placed arbitrarily within a standard cell without concern for cell-to-cell interface problems. However, when many standard cells are placed together on the chip, the edge exclusion zones associated with the standard cells can combine to occupy an expensive amount of chip area.

In view of the foregoing, it is of interest to optimize cell layout and placement such that chip area and routing resources can be most efficiently utilized, particularly when cells are defined according to a constrained layout architecture.

SUMMARY

In one embodiment, a semiconductor chip is disclosed. The semiconductor chip includes a logic block area. The logic block area includes a first chip level in which layout features are placed according to a first virtual grate. The logic block area also includes a second chip level in which layout features are placed according to a second virtual grate. A rational spatial relationship exists between the first and second virtual grates. A number of cells are placed within the logic block area. Each of the number of cells is defined according to an appropriate one of a number of cell phases. The appropriate cell phase causes layout features in the first and second chip levels of a given placed cell to be aligned with the first and second virtual grates as positioned within the given placed cell.

In another embodiment, a method is disclosed for defining cell variants of different cell phase to enable placement of cells within a designated area of a semiconductor chip. The method includes an operation for identifying a phase space for the designated area of the semiconductor chip. The phase space is defined as a distance extending perpendicularly between successive occurrences of a same relationship between the two virtual grates that have a rational spatial relationship within the designated area of the semiconductor chip. The method also includes an operation for aligning a left boundary of a subject cell with a left edge of the phase space. With the left boundary of the subject cell aligned with the left edge of the phase space, an operation is performed to define a first phase of the subject cell based on locations of the two virtual grates relative to the left boundary of the subject cell. The first phase of the subject cell is stored in a cell library. The method further includes an operation for moving the left boundary of the subject cell from its current position across the phase space to a next possible location of the left boundary of the subject cell within the phase space. With the left boundary of the subject cell aligned with the next possible location, an operation is performed to define a next phase of the subject cell based on locations of the two virtual grates relative to the left boundary of the subject cell. The next phase of the subject cell is stored in the cell library. The method continues by moving the left boundary of the subject cell to each of its possible locations within the phase space, and by defining and storing a different phase of the subject cell at each possible location of the left boundary of the subject cell within the phase space.

In another embodiment, a method is disclosed for placing cells within a designated area of a semiconductor chip. The method includes an operation for defining respective virtual grates for each of two phased chip levels within the designated area of the semiconductor chip. The virtual grates of the two phased chip levels are defined to have a rational spatial relationship. The method also includes an operation for placing cells within the designated area of the semiconductor chip. The method further includes an operation for determining a required cell phase for each placed cell within the designated area of the semiconductor chip. For each placed cell within the designated area of the semiconductor chip, an operation is performed to substitute a variant of the placed cell having the required cell phase, such that layout features in each of the two phased chip levels within the substituted variant of the placed cell align with the virtual grates of the two phased chip levels.

In one embodiment, a computer readable storage medium is disclosed to include a semiconductor chip layout recorded in a digital format. The semiconductor chip layout includes a logic block area including a first chip level in which layout features are placed according to a first virtual grate. The semiconductor chip layout also includes a second chip level in which layout features are placed according to a second virtual grate. A rational spatial relationship exists between the first and second virtual grates. The semiconductor chip layout further includes a number of cells placed within the logic block area. Each of the number of cells is defined according to an appropriate one of a number of cell phases. The appropriate one of the number of cell phases causes layout features in the first and second chip levels of a given placed cell to be aligned with the first and second virtual grates as positioned within the given placed cell.

In one embodiment, a cell library stored in a digital format on a computer readable storage medium is disclosed. The cell library includes a plurality of cell layouts corresponding to different phases of a given cell. The given cell includes at least one chip level in which layout features are placed in accordance with a virtual grate. The virtual grate is defined by a set of parallel equally spaced virtual lines extending across the cell layout. Each different phase of the given cell is defined by a different spacing between a reference cell boundary and a nearest virtual line of the virtual grate.

Other aspects and advantages of the invention will become more apparent from the following detailed description, taken in conjunction with the accompanying drawings, illustrating by way of example the present invention.

BRIEF DESCRIPTION OF THE DRAWINGS

FIGS. 3A-3H are illustrations showing different cell phases that may exist for a cell placed in the logic block of FIG. 2A, in accordance with one embodiment of the present invention;

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1A:
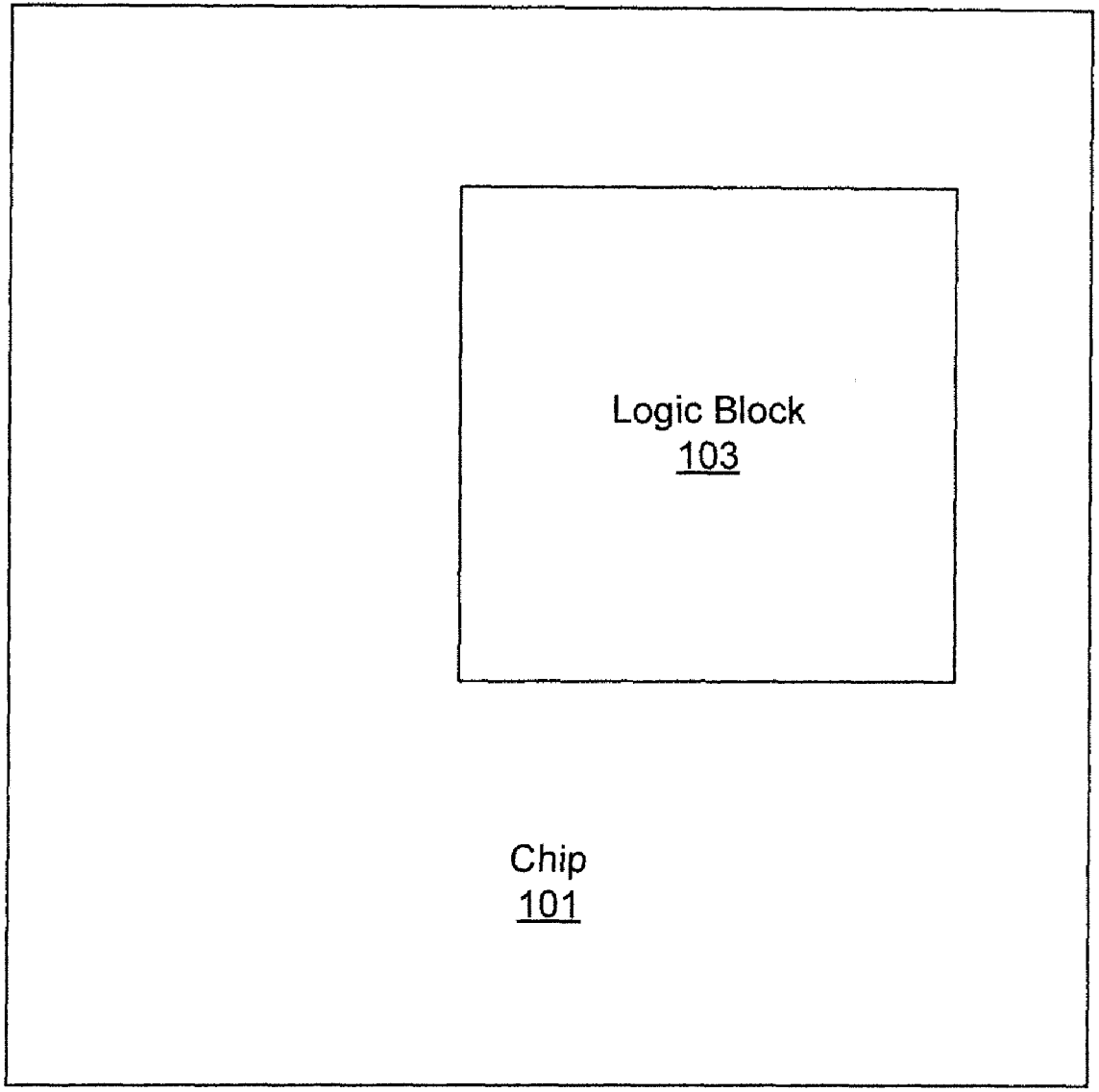
FIG. 1A is an illustration showing a semiconductor chip defined to include a logic block, in accordance with one embodiment of the present invention.

FIG. 1A is an illustration showing a semiconductor chip ("chip") 101 defined to include a logic block 103, in accordance with one embodiment of the present invention. The logic block 103 includes integrated circuit devices in the form of multi-level structures defined on a silicon substrate of the chip 101. At a substrate level, transistor devices with diffusion regions are formed. In subsequent levels, interconnect metallization lines are patterned and electrically connected to the transistor devices to define a desired integrated circuit device. Also, patterned conductive layers are insulated from other conductive layers by dielectric materials. The structural features used to define the diffusion regions, transistor devices, metallization lines, interconnects, etc. within each level of the chip 101 are defined according to a specified layout. Additionally, the global layout for a given level of the chip 101 may be segmented into many small layout areas, where each layout area is associated with a given logic construct. Moreover, layout areas within multiple levels of the chip 101 within a given vertical column of the chip 101 can be integrated together to form a logic unit referred to as a cell.

A cell, as referenced herein, represents an abstraction of a logic function, and encapsulates lower-level integrated circuit layouts for implementing the logic function. It should be understood that a given logic function can be represented by multiple cell variations, wherein the cell variations may be differentiated by feature size, performance, and process compensation technique (PCT) processing. For example, multiple cell variations for a given logic function may be differentiated by power consumption, signal timing, current leakage, chip area, OPC (optical proximity correction), RET (reticle enhancement technology), etc. It should also be understood that each cell description includes the layouts for the cell in each level of a chip within the associated vertical column of the chip, as required to implement the logic function of the cell. More specifically, a cell description includes layouts for the cell in each level of the chip extending from the substrate level up through a particular interconnect level.

Figure 1B:
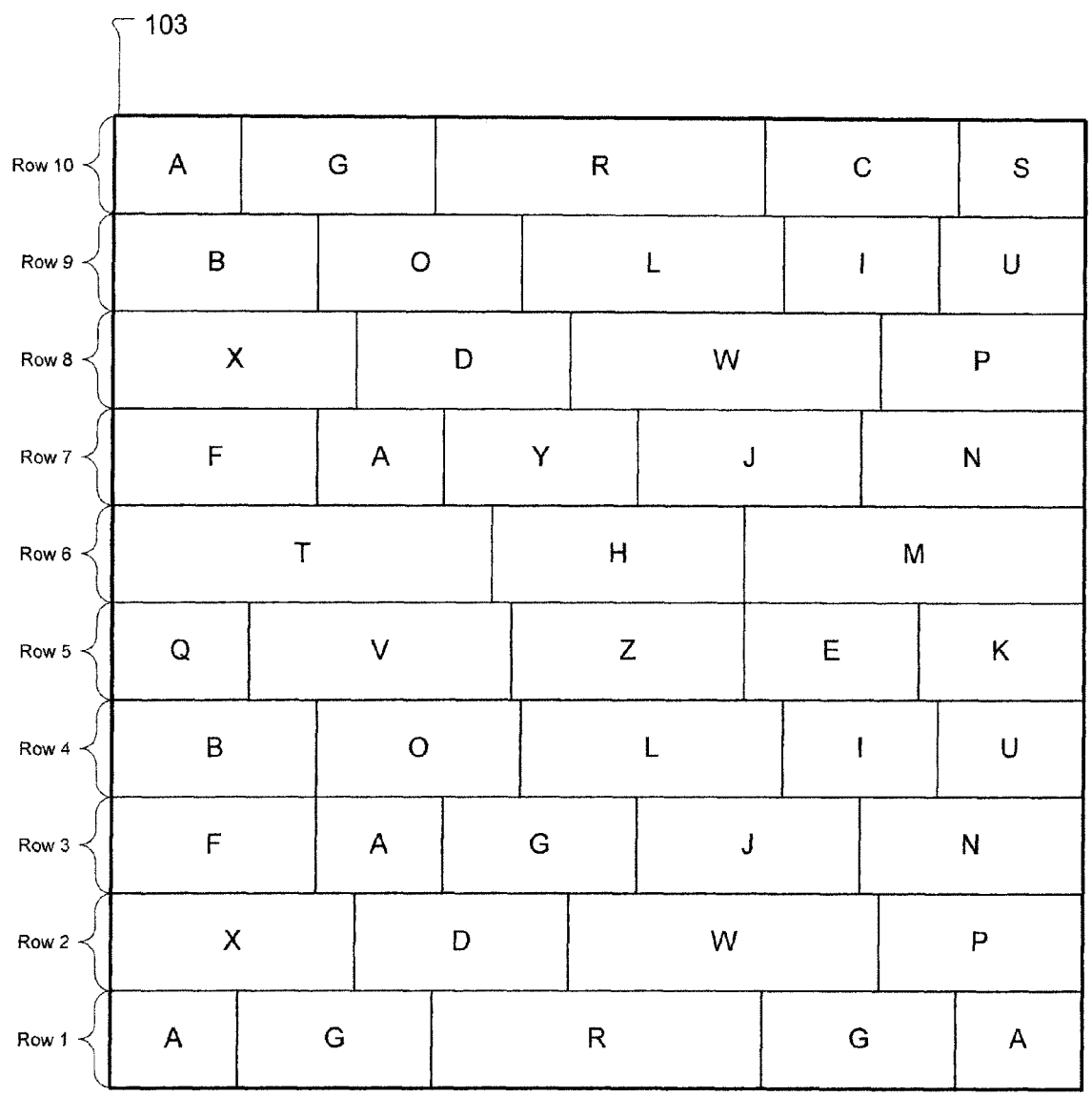
FIG. 1B is an illustration showing placement of cells in the logic block, in accordance with one embodiment of the present invention.

In one embodiment, the logic block 103 is defined by placing a number of cells of various logic function in rows within the logic block 103. For example, consider that a number of cells A-Z are available for use within the logic block 103, where each of cells A-Z is defined to perform a different logic function. In this exemplary embodiment, the logic block 103 may be defined by placement of cells A-Z within rows 1-10 of the logic block 103, as shown in FIG. 1B. In this exemplary embodiment, the width of the cells as measured from left-to-right across a given row can vary from cell-to-cell. However, the height of the cells as measured vertically within a given row is essentially the same from cell-to-cell, thereby allowing the logic block 103 to be populated by adjacently defined rows of cells of consistent height.

Also, in some embodiments, the height of cells may vary from row-to-row and/or within a row.

Figure 2A:
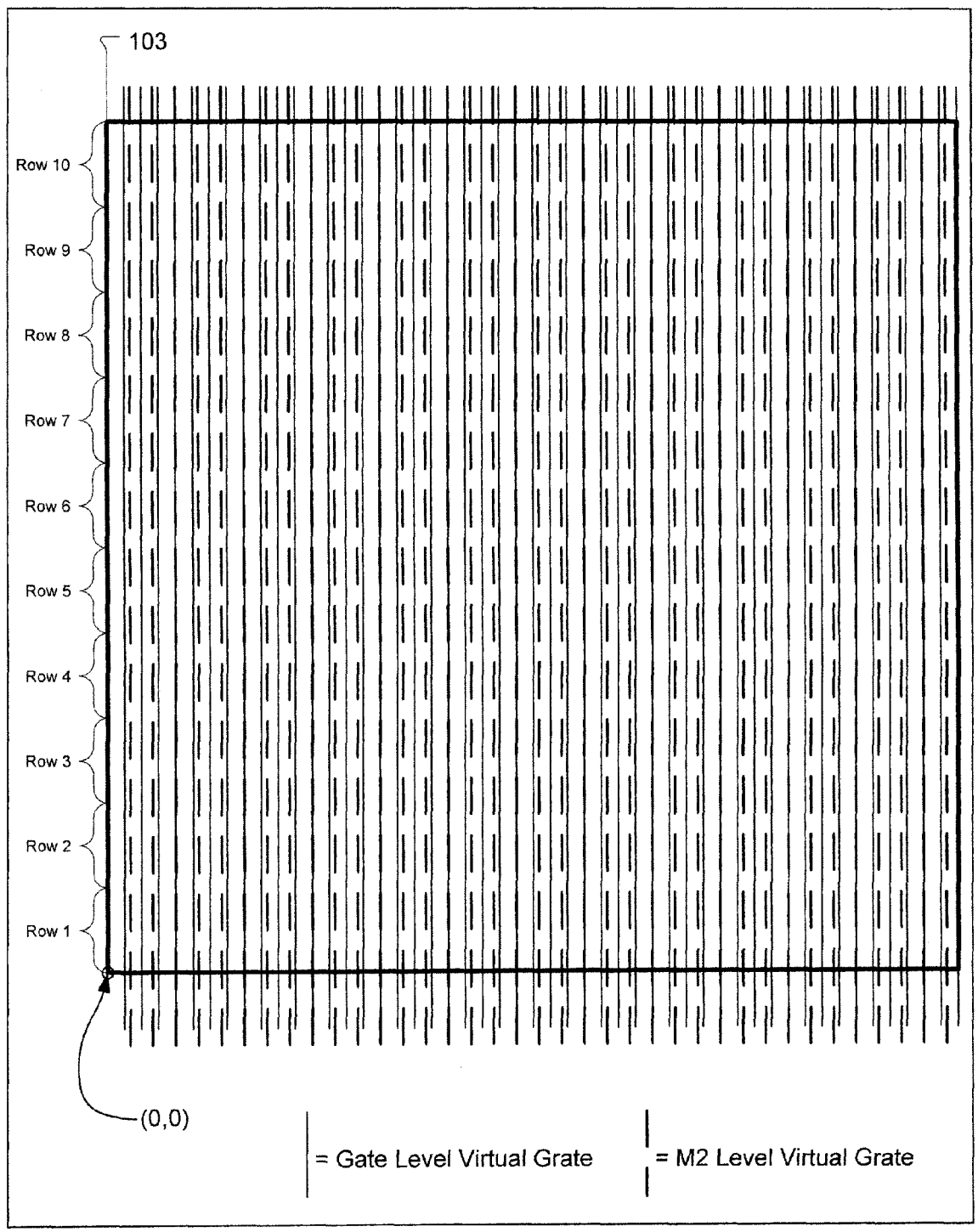
FIG. 2A is an illustration showing the logic block area of the chip having two separate virtual grates defined thereover, in accordance with one embodiment of the present invention.

A dynamic array architecture represents a semiconductor device design paradigm in which layout features are defined along a regular-spaced virtual grate (or regular-spaced virtual grid) in a number of levels of a cell, i.e., in a number of levels of a semiconductor chip, such as chip 101. The virtual grate is defined by a set of equally spaced, parallel virtual lines extending across a given level in a given chip area. The equal spacing, as measured perpendicularly between adjacent virtual lines of the virtual grate, is defined as the virtual grate pitch. For example, FIG. 2A shows the logic block 103 area of the chip 101 having two separate virtual grates defined thereover, in accordance with one embodiment of the present invention. More specifically, one virtual grate is defined over the logic block 103 for the gate level of the chip 101, and another virtual grate is defined over the logic block 103 for the second interconnect level (M2 level) of the chip 101.

In one embodiment, the virtual grate of a given level is oriented to be substantially perpendicular to the virtual grate of an adjacent level. For example, in this embodiment, a virtual grate for the first interconnect level (M1 level) (not shown) extends in a direction perpendicular to both the gate level and M2 level virtual grates. However, it should be appreciated, that in some embodiments, the virtual grate of a given level may be oriented either perpendicular or parallel to the virtual grate of an adjacent level.

In one embodiment, each virtual grate within various levels of the chip is indexed to an origin of a single coordinate system. Therefore, the coordinate system enables control of a spatial relationship between the virtual grates within the various levels of the chip. For example, in the exemplary embodiment of FIG. 2A, each of the gate level and M2 level virtual grates is indexed to an origin (0,0) of a coordinate system, where the origin (0,0) is located at a lower-left corner of the logic block 103 area on the chip 101. It should be understood that the origin (0,0) of the coordinate system can be located at any location on the chip 101, and is not required to be located at a particular position of a logic block in which cells are to be placed (e.g., at the lower-left corner of the logic block 103). Also, it should be understood that indexing of a virtual grate to a given spatial location means that the virtual grate is defined such that one of its virtual lines passes through the given spatial location.

The spatial relationship between virtual grates in various levels of the chip can be defined in essentially any number of ways. However, the spatial relationship between commonly oriented (i.e., parallel in direction of extent across the chip) virtual grates can be defined by a rational number, such that the virtual grates align with each other at a particular spatial frequency. Specifically, for any two virtual grates that are indexed to the origin of the same coordinate system, a ratio of their virtual grate pitches can be defined by a rational number, such that the two virtual grates align at a particular spatial frequency. For example, FIG. 2A shows that the spatial relationship between the M2 level and gate level virtual grates is defined by a M2 level-to-gate level virtual grate pitch ratio of 4/3. Thus, the M2 level and gate level virtual grates align with each other at every fourth gate level virtual grate line relative to the origin (0,0). Two virtual grates that are commonly oriented, indexed to a common spatial location, and have the ratio of their virtual grate pitches defined by a rational number are considered to have a rational spatial relationship.

Figure 8:
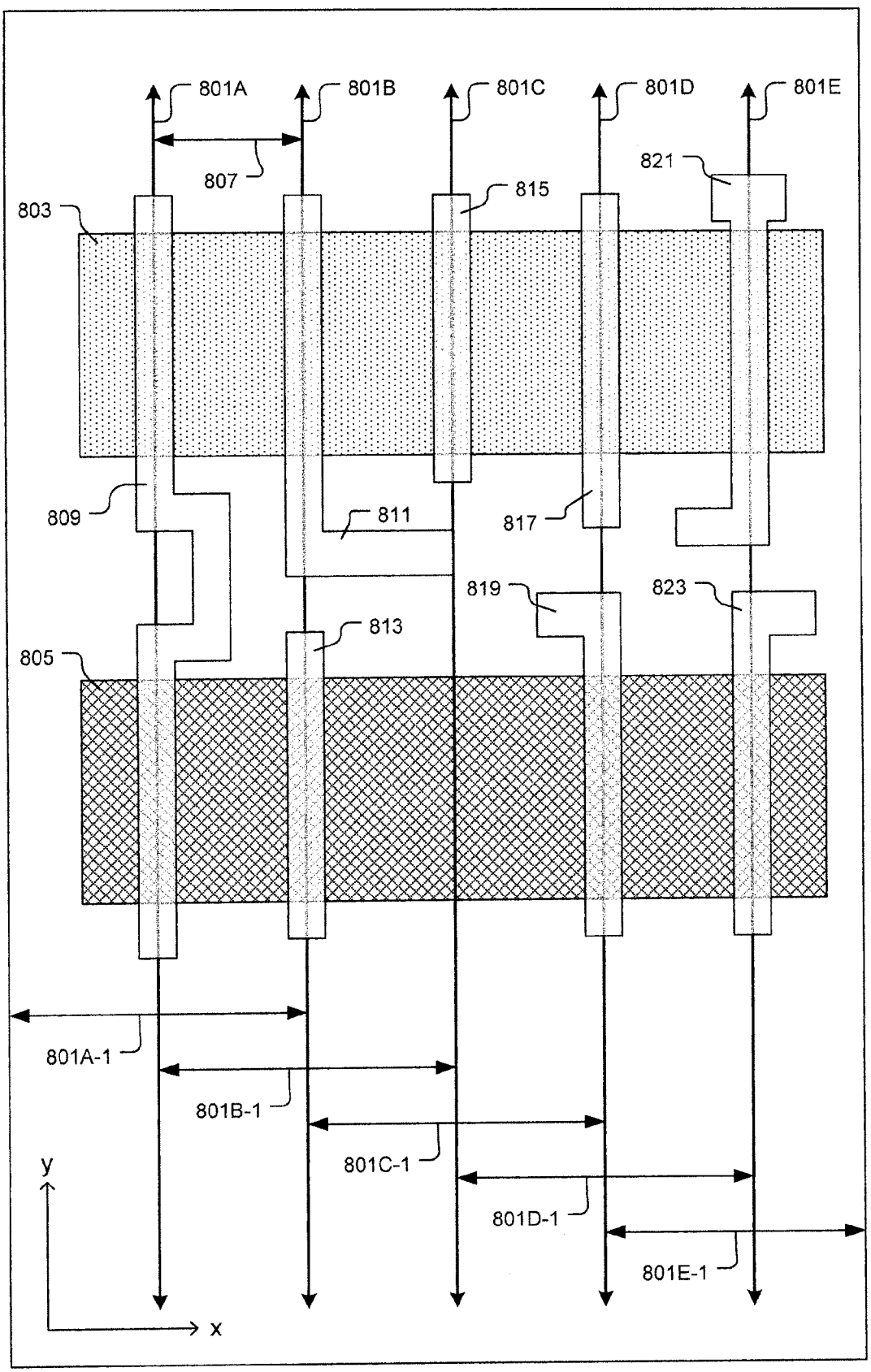
FIG. 8 shows an example of virtual lines defined within the dynamic array architecture, in accordance with one embodiment of the present invention.

FIG. 8 shows an example of virtual lines 801A-801E defined within the dynamic array architecture, in accordance with one embodiment of the present invention. Virtual lines 801A-801E extend across the layout in a parallel manner, with a perpendicular spacing therebetween equal to a specified pitch 807. For illustrative purposes, complementary diffusion regions 803 and 805 are shown in FIG. 8. It should be understood that the diffusion regions 803 and 805 are defined in a diffusion level below a gate level. Also, it should be understood that the diffusion regions 803 and 805 are provided by way of example and in no way represent any limitation on diffusion region size, shape, and/or placement within the diffusion level relative to the dynamic array architecture.

Within the dynamic array architecture, a feature layout channel is defined about a given virtual line so as to extend between virtual lines adjacent to the given virtual line. For example, feature layout channels 801A-1 through 801E-1 are defined about virtual lines 801A through 801E, respectively. It should be understood that each virtual line has a corresponding feature layout channel. Also, for virtual lines positioned adjacent to an edge of a prescribed layout space, e.g., adjacent to a cell boundary, the corresponding feature layout channel extends as if there were a virtual line outside the prescribed layout space, as illustrated by feature layout channels 801A-1 and 801E-1. It should be further understood that each feature layout channel is defined to extend along an entire length of its corresponding virtual line.

FIG. 8 further shows a number of exemplary layout features 809-823 defined in accordance with the feature layout channels 801A-1 through 801E-1 corresponding to virtual lines 801A through 801E, respectively. Within the dynamic array architecture, layout features associated with a given virtual line are defined within the feature layout channel associated with the virtual line. Also, physical contact is prohibited between layout features defined in feature layout channels that are associated with adjacent virtual lines.

A contiguous layout feature can include both a portion which defines an active part of a circuit, and a portion that does not define a part of the circuit. For example, in the gate level, a contiguous layout feature can extend over both a diffusion region and a dielectric region of an underlying chip level. In one embodiment, each portion of a gate level layout feature that forms a gate electrode of a transistor is positioned to be substantially centered upon a given virtual line. Furthermore, in this embodiment, portions of the gate level layout feature that do not form a gate electrode of a transistor can be positioned within the feature layout channel associated with the given virtual line. Therefore, a given gate level layout feature can be defined essentially anywhere within a feature layout channel, so long as gate electrode portions of the given gate level layout feature are centered upon the virtual line corresponding to the given feature layout channel, and so long as the given gate level layout feature complies with design rule spacing requirements relative to other gate level layout features in adjacent feature layout channels.

As shown in FIG. 8, the layout feature 809 is defined within the feature layout channel 801A-1 associated with virtual line 801A. Some portions of layout feature 809 are substantially centered upon the virtual line 801A. Also, other portions of layout feature 809 maintain design rule spacing requirements with layout features 811 and 813 defined within adjacent feature layout channel 801B-1. Similarly, layout features 811-823 are defined within their respective feature layout channel, and include portions substantially centered upon the virtual line corresponding to their respective feature layout channel. Also, it should be appreciated that each of layout features 811-823 maintains design rule spacing requirements with layout features defined within adjacent feature layout channels, and avoids physical contact with any other layout feature defined within adjacent feature layout channels.

As illustrated by the example feature layout channels 801A-1 through 801E-1 of FIG. 8, each feature layout channel is associated with a given virtual line and corresponds to a layout region that extends along the given virtual line and perpendicularly outward in each opposing direction from the given virtual line to a closest of either an adjacent virtual line or a virtual line outside a layout boundary. Also, it should be understood that each layout feature is defined within its feature layout channel without physically contacting another layout feature defined within an adjoining feature layout channel.

Some layout features may have one or more contact head portions defined at any number of locations along their length. A contact head portion of a given layout feature is defined as a segment of the layout feature having a height and a width of sufficient size to receive a contact structure, wherein "width" is defined across the substrate in a direction perpendicular to the virtual line of the given layout feature, and wherein "height" is defined across the substrate in a direction parallel to the virtual line of the given layout feature. It should be appreciated that a contact head of a layout feature, when viewed from above, can be defined by essentially any layout shape, including a square or a rectangle. Also, depending on layout requirements and circuit design, a given contact head portion of a layout feature may or may not have a contact defined thereabove.

In one embodiment, the layout features are defined to provide a finite number of controlled layout shape-to-shape lithographic interactions which can be accurately predicted and optimized for in manufacturing and design processes. In this embodiment, the layout features are defined to avoid layout shape-to-shape spatial relationships which would introduce adverse lithographic interaction within the layout that cannot be accurately predicted and mitigated with high probability. However, it should be understood that changes in direction of layout features within their feature layout channels are acceptable when corresponding lithographic interactions are predictable and manageable.

In one embodiment, each layout feature of a given level is substantially centered upon one of the virtual lines of the virtual grate associated with the given level. A layout feature is considered to be substantially centered upon a particular line of a virtual grate when a deviation in alignment between of the centerline of the layout feature and the particular line of the virtual grate is sufficiently small so as to not reduce a manufacturing process window from what would be achievable with a true alignment between of the centerline of the layout feature and the line of the virtual grate. Therefore, in this embodiment, layout features placed in different chip levels according to virtual grates of rational spatial relationship will be aligned at a spatial frequency defined by the rational spatial relationship. In one embodiment, the above-mentioned manufacturing process window is defined by a lithographic domain of focus and exposure that yields an acceptable fidelity of the layout feature. In one embodiment, the fidelity of a layout feature is defined by a characteristic dimension of the layout feature.

In the dynamic array architecture, variations in a vertical cross-section shape of an as-fabricated layout feature can be tolerated to an extent, so long as the variation in the vertical cross-section shape is predictable from a manufacturing perspective and does not adversely impact the manufacture of the given layout feature or its neighboring layout features. In this regard, the vertical cross-section shape corresponds to a cut of the as-fabricated layout feature in a plane perpendicular to both the centerline of the layout feature and the substrate of the chip. It should be appreciated that variation in the vertical cross-section of an as-fabricated layout feature along its length can correspond to a variation in width of the layout feature along its length. Therefore, the dynamic array architecture also accommodates variation in the width of an as-fabricated layout feature along its length, so long as the width variation is predictable from a manufacturing perspective and does not adversely impact the manufacture of the layout feature or its neighboring layout features.

Additionally, different layout features within a given level can be designed to have the same width or different widths. Also, the widths of a number of layout features defined along adjacent lines of a given virtual grate can be designed such that the number of layout features contact each other so as to form a single layout feature having a width equal to the sum of the widths of the number of layout features.

Within a given level defined according to the dynamic array architecture, proximate ends of adjacent, co-aligned linear-shaped layout features may be separated from each other by a substantially uniform gap. More specifically, adjacent ends of linear-shaped layout features defined along a common line of a virtual grate are separated by an end gap, and such end gaps within the level associated with the virtual grate may be defined to span a substantially uniform distance. Additionally, in one embodiment, a size of the end gaps is minimized within a manufacturing process capability so as to optimize filling of a given level with linear-shaped layout features.

Also, in the dynamic array architecture, a level can be defined to have any number of virtual grate lines occupied by any number of layout features. In one example, a given level can be defined such that all lines of its virtual grate are occupied by at least one layout feature. In another example, a given level can be defined such that some lines of its virtual grate are occupied by at least one layout feature, and other lines of its virtual grate are vacant, i.e., not occupied by any layout features. Furthermore, in a given level, any number of successively adjacent virtual grate lines can be left vacant. Also, the occupancy versus vacancy of virtual grate lines by layout features in a given level may be defined according to a pattern or repeating pattern across the given level.

Additionally, within the dynamic array architecture, vias and contacts are defined to interconnect a number of the layout features in various levels so as to form a number of functional electronic devices, e.g., transistors, and electronic circuits. Layout features for the vias and contacts can be aligned to a virtual grid, wherein a specification of this virtual grid is a function of the specifications of the virtual grates associated with the various levels to which the vias and contacts will connect. Thus, a number of the layout features in various levels form functional components of an electronic circuit. Additionally, some of the layout features within various levels may be non-functional with respect to an electronic circuit, but are manufactured nonetheless so as to reinforce manufacturing of neighboring layout features.

It should be understood that the dynamic array architecture is defined to enable accurate prediction of semiconductor device manufacturability with a high probability, even when layout features of the semiconductor device are sized smaller than a wavelength of light used to render the layout features in a lithographic manufacturing process. Additionally, it should be understood that the dynamic array architecture is defined by placement of layout features on a regular-spaced grate (or regular-spaced grid) in a number of levels of a cell, such that layout features in a given level of the cell are confined within their feature layout channel, and such that layout features in adjacent feature layout channels do not physically contact each other. Furthermore, it should be understood that the dynamic array architecture can be applied to one or more chip levels. For example, in one embodiment, only the gate level of the chip is defined according to the dynamic array architectures. In another embodiment, the gate level and one or more interconnect levels are defined according to the dynamic array architecture.

Figure 2B:
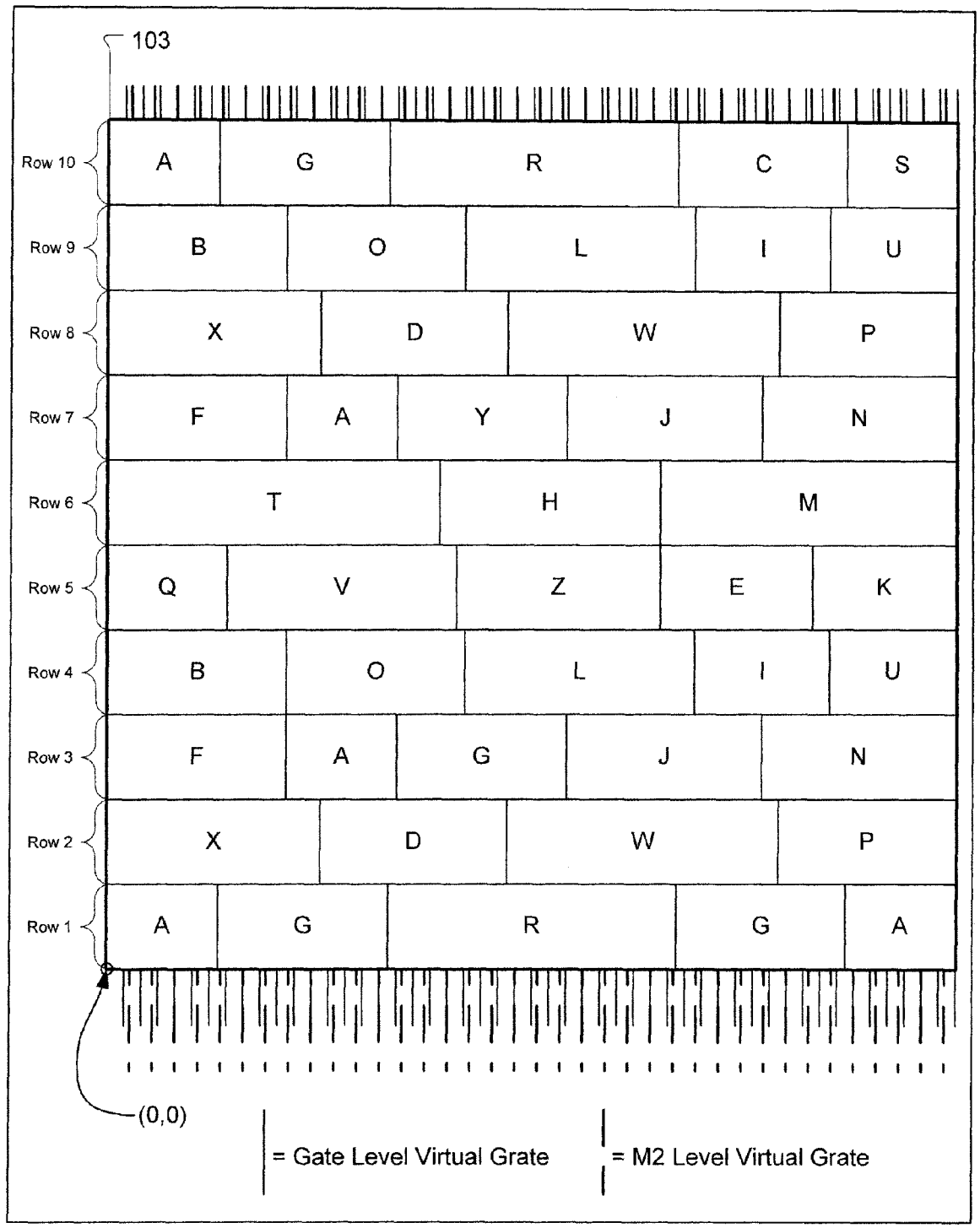
FIG. 2B is an illustration showing the exemplary logic block in conjunction with the gate level and M2 level virtual grates, which are indexed to the origin at the lower-left corner of the logic block, in accordance with one embodiment of the present invention.

With reference back to FIG. 1B, the exemplary logic block 103 is defined by placement of cells A-Z within rows 1-10. FIG. 2B is an illustration showing the exemplary logic block 103 in conjunction with the gate level and M2 level virtual grates, which are indexed to the origin (0,0) at the lower-left corner of the logic block 103. In one embodiment of the dynamic array architecture, in order for each of cells A-Z to be placeable within the logic block 103, each of cells A-Z should be defined based on use of the gate level and M2 level virtual grates of the logic block 103. However, depending on where a cell is placed in the logic block 103, a position of the gate level and M2 level virtual grates may vary within the boundaries of the cell, and relative to the boundaries of the cell. For example, a distance between the left boundary of the cell and the nearest gate level virtual grate line within the cell can vary between different positions of the cell in the logic block 103. Similarly, a distance between the left boundary of the cell and the nearest M2 level virtual grate line within the cell can vary between different positions of the given cell in the logic block 103.

Each cell placed within the logic block 103 should have its cell-based gate level and M2 level virtual grates aligned with the gate level and M2 level virtual grates of the logic block 103. Because the position of the gate level and M2 level virtual grates of the logic block 103 can vary within a given cell depending on where the given cell is placed in the logic block 103, it is necessary to have different versions of the given cell available for placement in the logic block 103, such that at least one version of the given cell is defined to have its gate level and M2 level virtual grates respectively align with the gate level and M2 level virtual grates of the logic block 103.

Generally speaking, each cell is defined to have a width that is an integer multiple of either a virtual grate pitch, or one-half of a virtual grate pitch, to enable alignment of the cell boundaries to either a virtual grate line or a midpoint between adjacent virtual grate lines. In one embodiment, each cell is defined to have a width that is an integer multiple of one-half of the gate level virtual grate pitch. In another embodiment, each cell is defined to have a width that is an integer multiple of the gate level virtual grate pitch. Additionally, each cell can be placed in the logic block 103 such that its left cell boundary is aligned with either a gate level virtual grate line or a midpoint between adjacent gate level virtual grate lines. Therefore, when the cell width is an integer multiple of one-half of the gate level virtual grate pitch, the right cell boundary will also be aligned with either a gate level virtual grate line or a midpoint between adjacent gate level virtual grate lines. For ease of discussion, placement of a cell such that its left cell boundary is aligned with either a gate level virtual grate line or a midpoint between adjacent gate level virtual grate lines is referred to as placement of the cell on the gate level virtual grate half-pitch.

Placement of cells on the gate level virtual grate half-pitch in combination with the rational spatial relationship between the gate level and M2 level virtual grates enables creation of a finite number of layout variations for a given cell, such that a suitable layout variation for the given cell is available for each possible combination of gate level and M2 level virtual grate placements that may occur within the given cell, depending upon where the given cell is placed in the logic block 103. In this regard, each layout variation for a given cell defines a cell phase, wherein each cell phase is defined by a different combination of gate level and M2 level virtual grate placements within the given cell relative to a reference boundary of the given cell, e.g., relative to the left boundary of the given cell.

It should be understood that in the above-described embodiment, the width of each cell is an integer multiple of the gate level virtual grate half-pitch, but not necessarily an integer multiple of the M2 level virtual grate pitch. Therefore, although the left and right cell boundaries will align with the gate level virtual grate, the left and right cell boundaries may not always align with the M2 level virtual grate. However, the cell phasing methods described herein allow for placement of active M2 level layout shapes on the M2 level virtual grate. Therefore, the cell phasing and cell placement methods described herein, in conjunction with the dynamic array architecture, serve to optimize routing resources by not having an M2 level layout shape placed between adjacent M2 level virtual grate lines so as to consume the two adjacent M2 level virtual grate lines with one M2 level layout shape.

FIGS. 3A-3H illustrate different cell phases that may exist for a cell placed under the following conditions:
1. The cell is placed in a logic block defined according to the dynamic array architecture where the rational spatial relationship between the M2 level and gate level virtual grates is defined by a M2 level-to-gate level virtual grate pitch ratio of 4/3;
2. The cell is placed on the gate level virtual grate half-pitch; and
3. The cell width is an integer multiple of one-half of the gate level virtual grate pitch.

It should be understood that the cell phasing principles illustrated in FIGS. 3A-3H can be applied to any combination of commonly oriented chip levels (i.e., beyond the illustrated gate and M2 levels) having any rational spatial relationship (i.e., beyond the 4/3 M2-to-gate pitch ratio), so long as the virtual grates of the logic block that are associated with the cell phasing are indexed to a common spatial location.

Figure 3A:
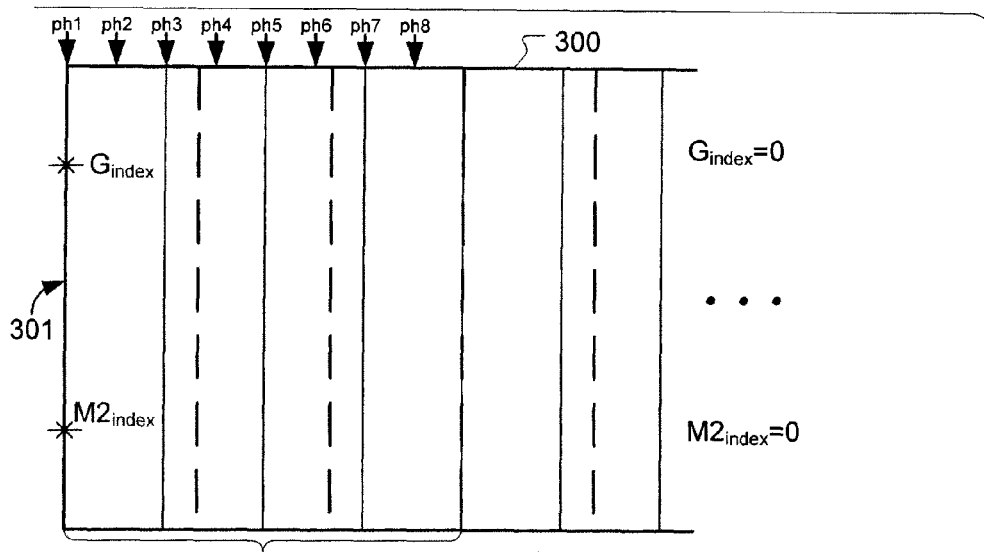

FIG. 3A shows a first phase (ph1) of a cell 300. The cell 300 includes a left cell boundary 301. The cell 300 is defined by a gate level virtual grate represented by commonly oriented solid lines, and by a M2 level virtual grate represented by commonly oriented dashed lines. The pitch ratio between the M2 level and gate level virtual grates is 4/3. Therefore, the M2 level and gate level virtual grates will align with each other at every fourth gate level virtual grate line. The number of gate level virtual grate lines between alignment of the gate level and M2 level virtual grates defines a phase space 303. Generally speaking, a phase space is defined as a distance extending perpendicularly between successive occurrences of a same relationship between the two virtual grates that have a rational spatial relationship. In the exemplary embodiment of FIGS. 3A-3H the successive occurrences of a same relationship between the two virtual grates that have a rational spatial relationship correspond to successive alignments of the two virtual grates that have the rational spatial relationship.

Each cell phase is associated with a different allowed position of the left cell boundary 301 (e.g., reference cell boundary) within the phase space 303. In the example of FIGS. 3A-3H, the left cell boundary 301 can be placed on the gate level virtual grate half-pitch. Therefore, the left cell boundary 301 can be placed on each gate level virtual grate line within the phase space 303, and at the midpoint between adjacent gate level virtual grate lines within the phase space 303. Therefore, because the phase space 303 covers four gate level virtual grate pitches and because the cell can be placed on the gate level virtual grate half-pitch, the number of possible cell phases is eight. In FIGS. 3A-3H, the position of the left cell boundary 301 for each of the eight possible cell phases is identified by a respective arrow labeled ph1-ph8. Because the gate level and M2 level virtual grates are associated with the logic block 103, their respective positions remain unchanged in each of FIGS. 3A-3H as the left cell boundary 301 is shifted through the eight possible phases (ph1-ph8).

It should be understood that the eight possible cell phases of FIGS. 3A-3H are a result of the particular specifications of the exemplary embodiment. For example, in another embodiment, if the phase space 303 covered four gate level virtual grate pitches, but the cell could only be placed on the gate level virtual grate (whole) pitch, the number of possible cell phases would be four instead of eight, and would correspond to cell phases (ph1, ph3, ph5, ph7) as shown in FIGS. 3A-3H.

Generally speaking, a cell phase is defined by a combination of index values for each of the chip levels associated with the phasing. The index value for a given chip level as used in defining a cell phase represents a distance measured perpendicularly between the left boundary of the cell and the nearest virtual line of the given chip level's virtual grate. It should be understood that each phased chip level of a given cell has a corresponding index value. Also, it should be understood that a phased chip level of a cell is any chip level of the cell defined by a virtual grate that has a rational spatial relationship with a virtual grate of at least one other chip level of the cell. Also, as previously discussed, a rational spatial relationship exists between two chip levels when each of the two chip levels is defined by commonly oriented virtual grates that are indexed to a common spatial location, and have the ratio of their virtual grate pitches defined by a rational number. In the exemplary embodiment of FIGS. 3A-3H, each cell phase (ph1-ph8) is defined by two index values: 1) $G_{index}$, and 2) $M2_{index}$, where $G_{index}$ is the index value for the gate level and $M2_{index}$ is the index value for the M2 level. As shown in FIGS. 3A-3H, each phase is defined by a unique combination of $G_{index}$ and $M2_{index}$ values.

The cell phasing example illustrated by FIGS. 3A-3H is based on a virtual grate phasing relationship in which the two virtual grates are indexed to periodically align with each other according to their rational spatial relationship. It should be understood, however, that in some embodiments, virtual grates can be phased with each other without actually aligning with each other. For example, FIGS. 3I-3P illustrate another embodiment in which the pitch ratio between the M2 level and gate level virtual grates is 4/3, and in which the M2 level virtual grate is indexed in an offset relationship with the gate level virtual grate, such that the M2 level and gate level virtual grates do not align with each other at any phase. The same concepts described with regard to FIGS. 3A-3H also apply to FIGS. 3I-3P. Generally speaking, it should be understood that the phase space 303' in FIGS. 3I-3P is defined over an area between extending successive occurrences of a same relationship between the phased virtual grates. Specifically, at phase (ph1') the index value for the gate level is given by $G_{index}=0$, and the index value for the M2 level is given by $M2_{index}=(1/6)*G_{pitch}$. Therefore, the phase space 303' extends to a location where the phase (ph1') reoccurs, i.e., where $G_{index}=0$ and $M2_{index}=(1/6)*G_{pitch}$. For ease of discussion, the remainder of the description herein is provided with reference to the phasing as illustrated in FIGS. 3A-3H.

In one embodiment, a cell library is compiled to include a number of different cells defined in accordance with the dynamic array architecture, and further defined based on a particular rational spatial relationship between particular chip levels. For example, with respect to the logic block 103 embodiment of FIGS. 2A-2B, a cell library can be compiled to include cells A-Z, where each of cells A-Z is defined in accordance with the dynamic array architecture, and is further defined based on a rational spatial relationship of 4/3 between the virtual grate pitches of the M2 level and the gate level. To ensure that gate level and M2 level layouts of each cell in the library can be aligned with the gate level and M2 level virtual grates of the logic block 103, regardless of cell placement within the logic block, the cell library should include variants of each cell that respectively correspond to each possible cell phase. Therefore, with regard to the embodiment of FIGS. 2A-2B, the cell library should include eight different cell variants (one for each cell phase) for each of cells A-Z. Variants of cells A-Z for cell phases 1 through 8 may be identified as A-ph1, A-ph2, . . . Z-ph7, Z-ph8.

Figure 2C:
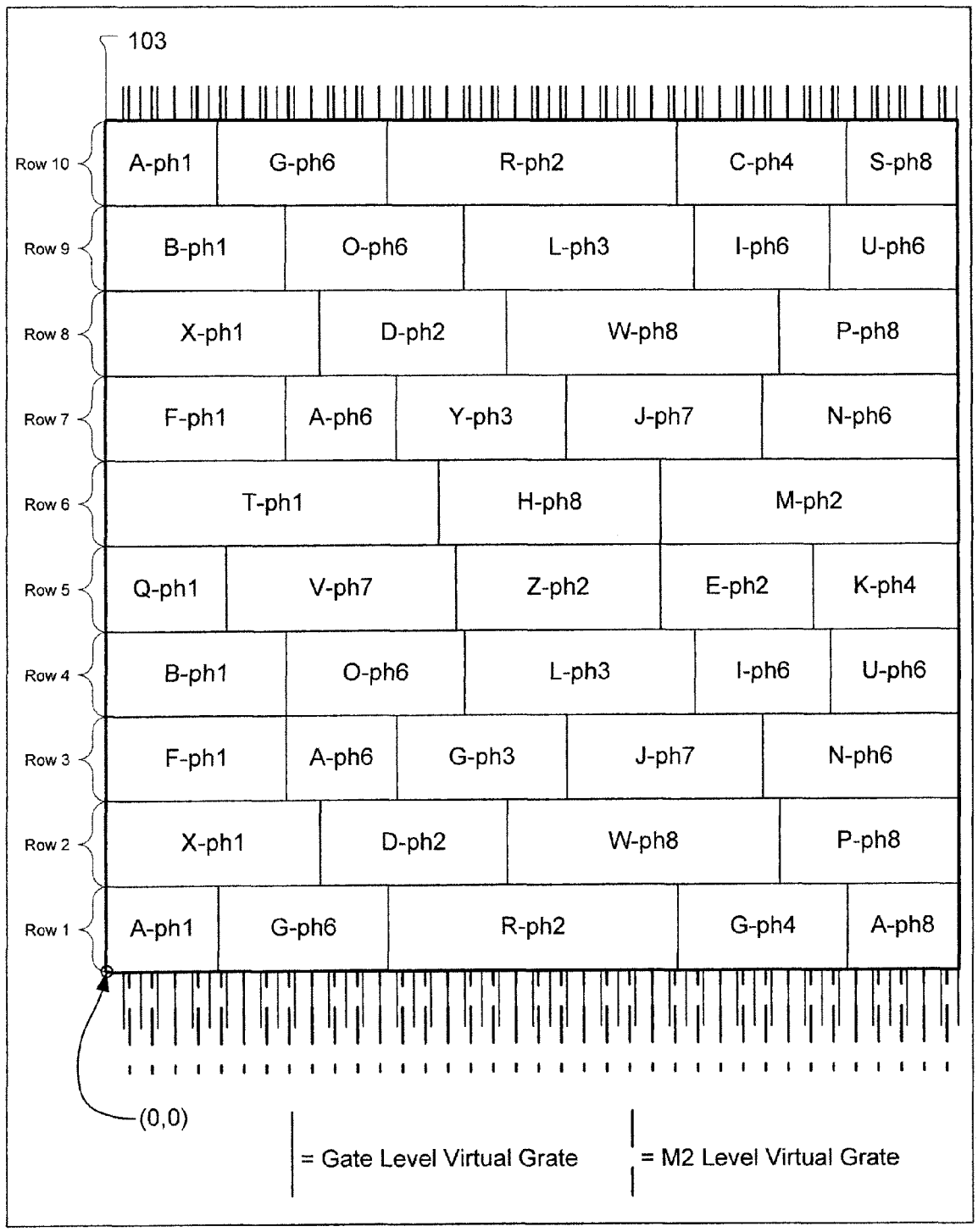
FIG. 2C is an illustration showing the cell placement of FIG. 2B, with an appropriate cell variant substituted for each cell based on the required cell phasing for the various cell placements within the logic block, in accordance with one embodiment of the present invention.

In one embodiment, cells may be first placed in the logic block 103 without regard to cell phasing, as shown in FIG. 2B. Then, each placed cell can be replaced by an appropriate variant corresponding to the required cell phase based on its exact position in the logic block 103, relative to the gate level and M2 level virtual grates of the logic block 103. In another embodiment, appropriate cell variants corresponding to the required cell phasing can be determined when the cells are initially placed in the logic block 103. FIG. 2C shows the cell placement of FIG. 2B, with an appropriate cell variant substituted for each cell based on the required cell phasing for the various cell placements within the logic block 103.

As previously discussed, each cell phase is defined by the combination of index values for the phased chip levels. Therefore, in order to determine the appropriate cell phase to be used for a given cell placement, the index values for the phased chip levels of the placed cell are calculated. Then, the calculated index values for the phased chip levels of the placed cell are compared to the index values of the various cell phases to identify the matching cell phase. The matching cell phase of the placed cell is then substituted for the placed cell.

For example, in the embodiment of FIG. 2B, each cell phase is defined by the combination of the gate level index value ($G_{index}$) and the M2 level index value ($M2_{index}$). Therefore, in order to determine the appropriate cell phase to be used for a given cell placement, the $G_{index}$ and the $M2_{index}$ values for the placed cell are calculated. Then, the calculated $G_{index}$ and $M2_{index}$ values for the placed cell are compared to the $G_{index}$ and $M2_{index}$ values of the various cell phases to identify the matching cell phase. Then, the matching cell phase of the placed cell is substituted for the originally placed cell.

To illustrate further, consider the leftmost placed cell A of Row 1 in the logic block 103 of FIG. 2B as the subject cell. The $G_{index}$ value of the subject cell is calculated to be zero, i.e., the left cell boundary 301 is aligned with the gate level virtual grate. The $M2_{index}$ value of the subject cell is calculated to be zero, i.e., the left cell boundary 301 is aligned with the M2 level virtual grate. The calculated index values of the subject cell ($G_{pitch}=0$, and $M2_{index}=0$) match the index values of cell phase 1, as shown in FIG. 3A. Therefore, cell phase 1 should be used for the subject cell, as indicated by corresponding cell A-ph1 in Row 1 of FIG. 2C.

To illustrate further, consider the rightmost placed cell U of Row 4 in the logic block 103 of FIG. 2B as the subject cell. The $G_{index}$ value of the subject cell is calculated to be $((1/2)*G_{pitch})$, wherein $G_{pitch}$ is the gate level virtual grate pitch. The $M2_{index}$ value of the subject cell is calculated to be $((1/6)*G_{pitch})$. The calculated index values of the subject cell ($G_{pitch}=((1/2)*G_{pitch})$, and $M2_{index}=((1/6)*G_{pitch})$) match the index values of cell phase 6, as shown in FIG. 3F. Therefore, cell phase 6 should be used for the subject cell, as indicated by corresponding cell U-ph6 in Row 4 of FIG. 2C.

Figure 4:
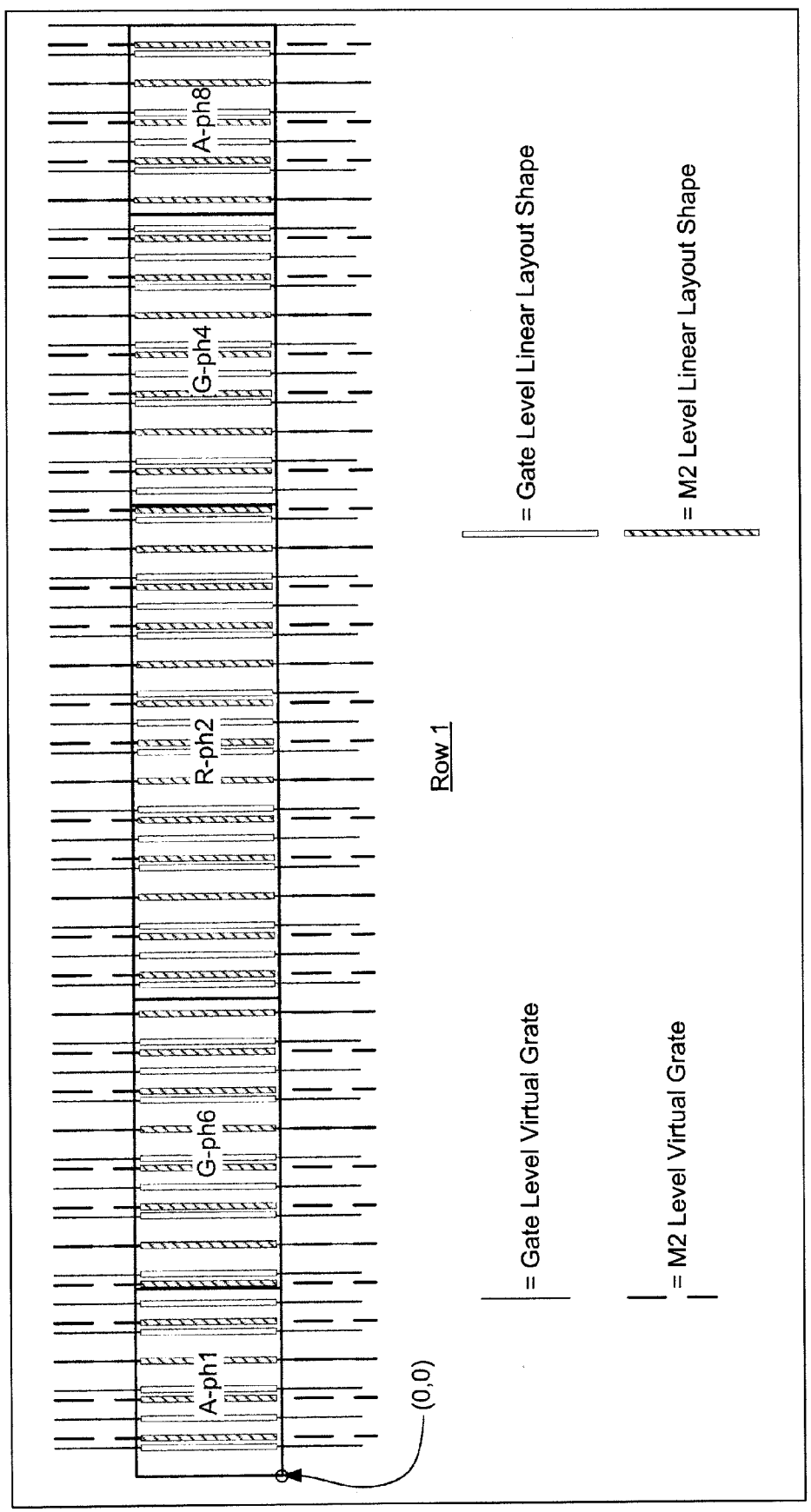
FIG. 4 is an illustration showing Row 1 of the logic block of FIG. 2C, with exemplary gate level and M2 level layout shapes depicted for each cell therein, in accordance with one embodiment of the present invention.

FIG. 4 shows Row 1 of the logic block 103 of FIG. 2C, with exemplary gate level and M2 level layout shapes depicted for each cell therein. Due to specification of the appropriate cell phase for each cell in Row 1, it can be seen that the gate level layout shapes of each cell align with the gate level virtual grate of the logic block 103, and the M2 level layout shapes of each cell align with the M2 level virtual grate of the logic block 103.

The cell phasing methods described herein with regard to the M2 level-to-gate level rational spatial relationship can be equally applied to any plurality of chip levels. Additionally, the rational spatial relationship between any two chip levels can be based on essentially any virtual grate pitch ratio between the two chip levels. For example, while the exemplary embodiments of FIGS. 2A-4 are based on a M2 level-to-gate level pitch ratio of 4/3, the M2 level-to-gate level pitch ratio in other embodiments may be 3/2, 5/3, 5/4, 2/3, 3/5, 4/5, etc.

It should be appreciated that the cell phasing methods described herein provide for maximum packing of cells within a given chip area, e.g., logic block 103, without comprising adherence to the dynamic array architecture. In other words, the cell phasing methods described herein allow cells to be placed cell boundary-to-cell boundary within the given chip area, while ensuring that the layout shapes within the phased chip levels of the cells align with virtual grates of the phased chip levels. Therefore, the cell phasing methods described herein alleviate the need to expand a width of a cell to accommodate alignment of layout features within the cell to multiple virtual grates, thereby providing for optimized chip area utilization in conjunction with use of the dynamic array architecture. Additionally, the cell phasing methods described herein alleviate the need to leave unoccupied chip area between adjacently placed cells to accommodate alignment of layout features within the cell to multiple virtual grates, thereby providing for optimized chip area utilization in conjunction with use of the dynamic array architecture.

Figure 5:
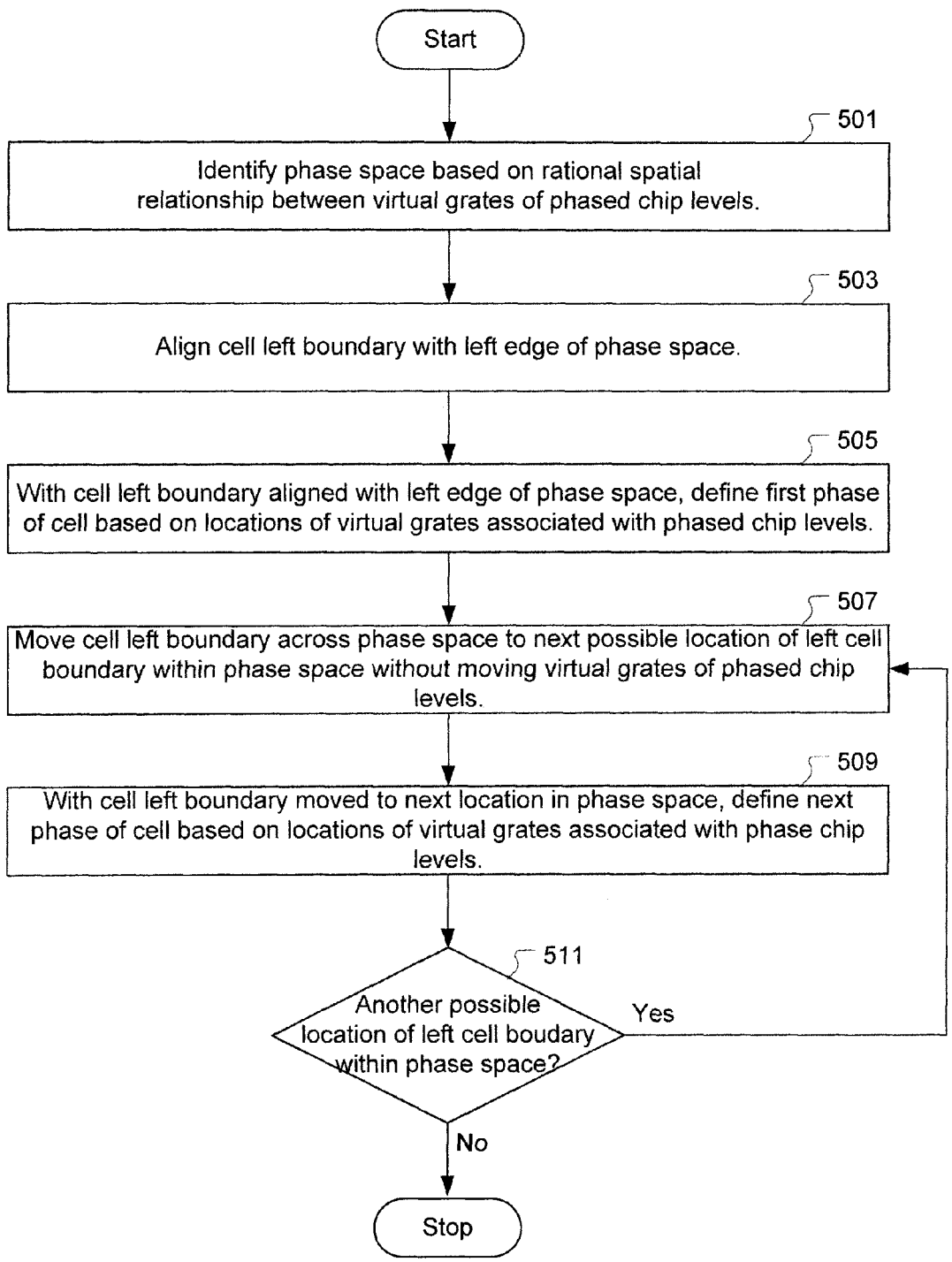
FIG. 5 is an illustration showing a flowchart of a method for defining cell variants of differing cell phase to enable placement of cells within an area on a semiconductor chip defined according to a dynamic array architecture, in accordance with one embodiment of the present invention.

FIG. 5 is an illustration showing a flowchart of a method for defining cell variants of differing cell phase to enable placement of cells within an area of a semiconductor chip defined according to a dynamic array architecture, in accordance with one embodiment of the present invention. It should be understood that the area on the semiconductor chip may correspond to an area that is substantially smaller than the total area of the semiconductor chip. The method includes an operation 501 for identifying a phase space based on a rational spatial relationship between virtual grates of phased chip levels. The virtual grates of the phased chip levels represent part of the dynamic array architecture used to define the area of the semiconductor chip. As previously discussed, the phase space is defined as a distance extending perpendicularly between successive alignment positions of two virtual grates that have a rational spatial relationship. For example, if first and second virtual grates have a rational spatial relationship such that the first and second virtual grates align at every fourth virtual line of the first virtual grate, then the phase space spans a distance of four times the pitch of the first virtual grate extending between successive alignments of the first and second virtual grates.

The method continues with an operation 503 in which a left boundary of a subject cell is aligned with a left edge of the phase space. Therefore, following operation 503, the left boundary of the subject cell is simultaneously aligned with a virtual line of each virtual grate of the phased chip levels. FIG. 3A shows an example of alignment between the left boundary 301 of the cell 300 and the left edge of the phase space 303. Thus, in the example of FIG. 3A, the left boundary 301 of the cell 300 is simultaneously aligned with a virtual line of each virtual grate of the phased chip levels (i.e., the gate level and the M2 level).

With the left boundary of the subject cell aligned with the left edge of the phase space, the method continues with an operation 505 for defining a first phase of the subject cell based on locations of the virtual grates of the phased chip levels relative to the left cell boundary. The first phase of the subject cell represents a first variant of the subject cell that is suitable for placement on the semiconductor chip at a location where the first phase of a given cell is required. The first phase of the subject cell can be characterized by index values for each phased chip level, where the index value for a given phased chip level is defined as the distance measured perpendicularly between the left boundary of the cell and the nearest virtual line of the given chip level's virtual grate within the phase space. FIGS. 3A-3H show corresponding index values $G_{index}$ and $M2_{index}$ for the gate and M2 phased chip levels. Operation 505 includes storage of the first phase of the subject cell in a cell library for future recall and use. In one embodiment, the cell library is stored in a digital format on a computer readable medium.

Figure 3B:
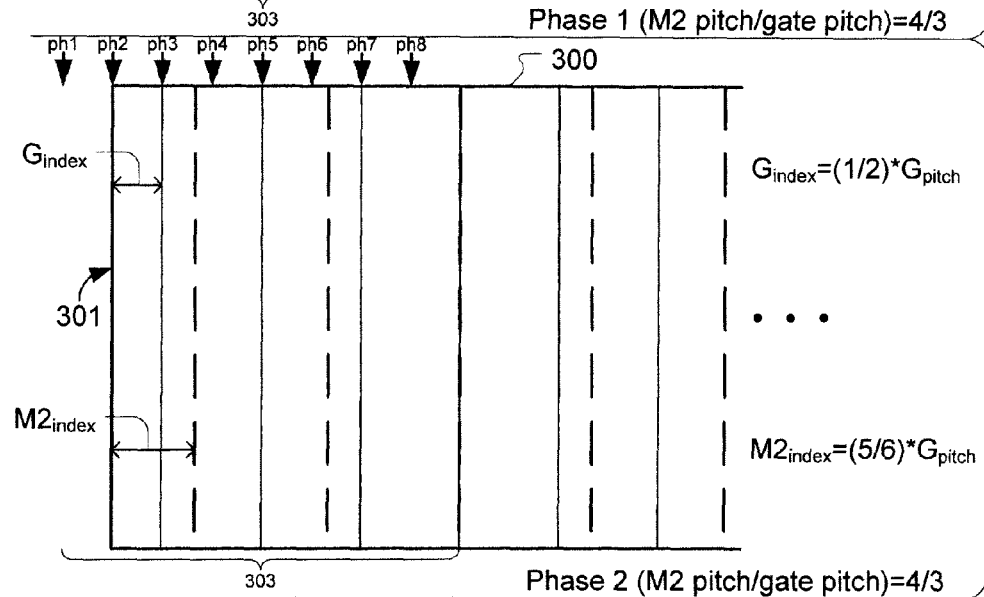
Figure 3C:
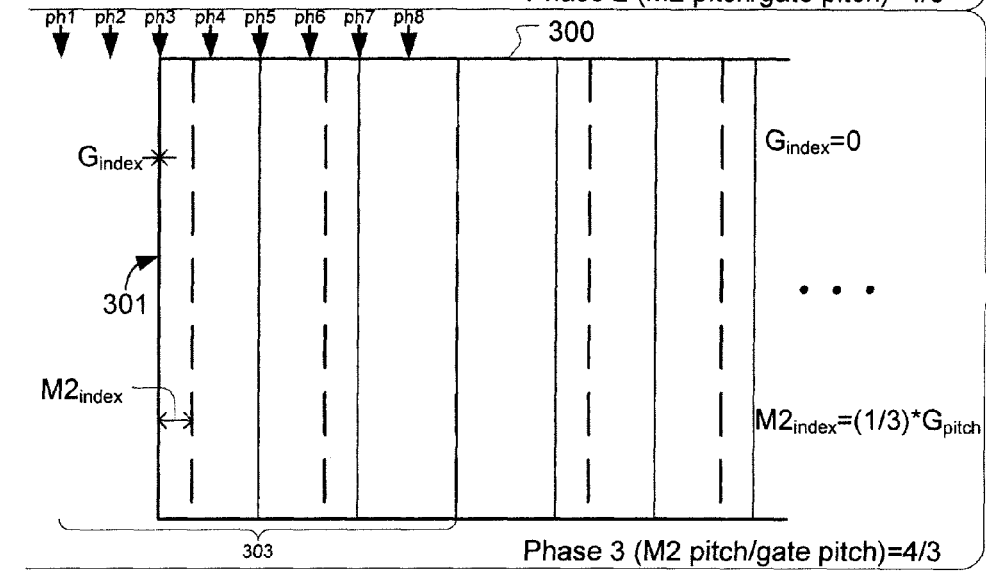
Figure 3G:
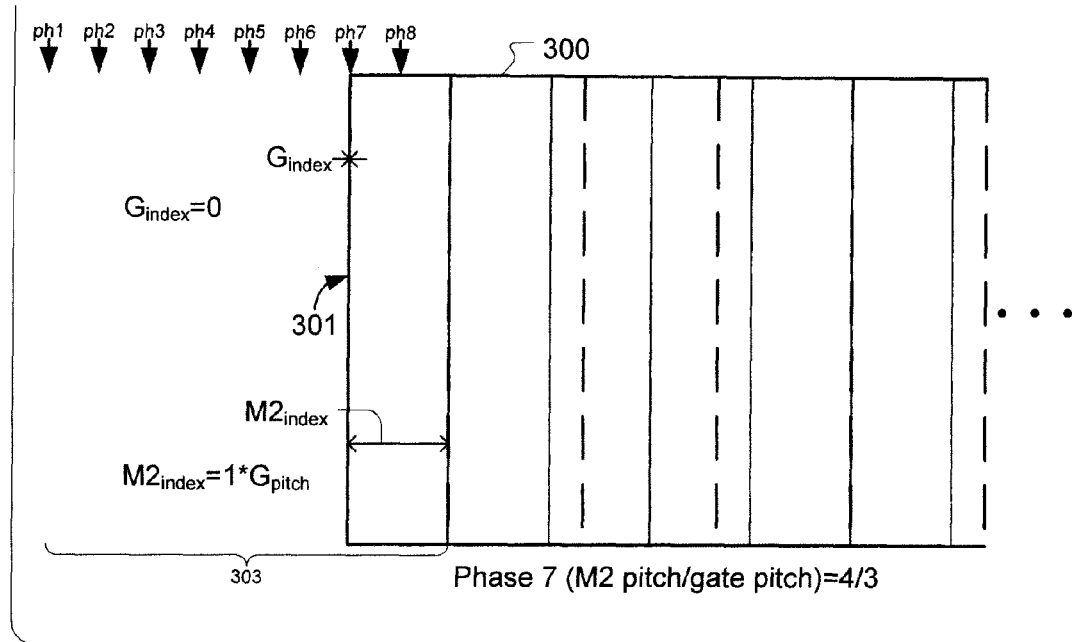
Figure 3H:
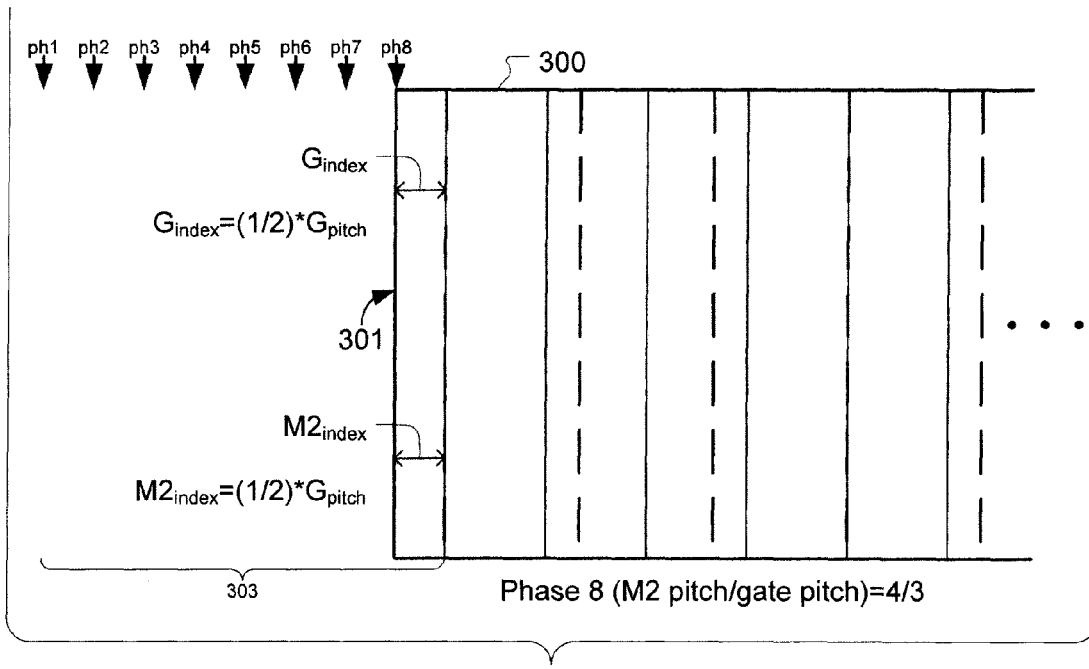
Figure 3I:
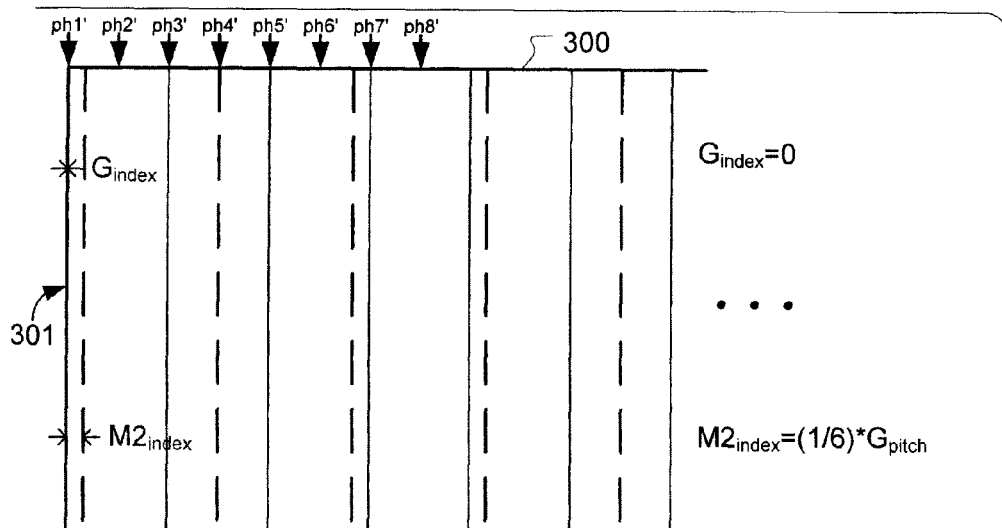
FIGS. 3I-3P are illustrations showing different cell phases in which virtual grates are phased with each other without actually aligning with each other, in accordance with one embodiment of the present invention.
Figure 3J:
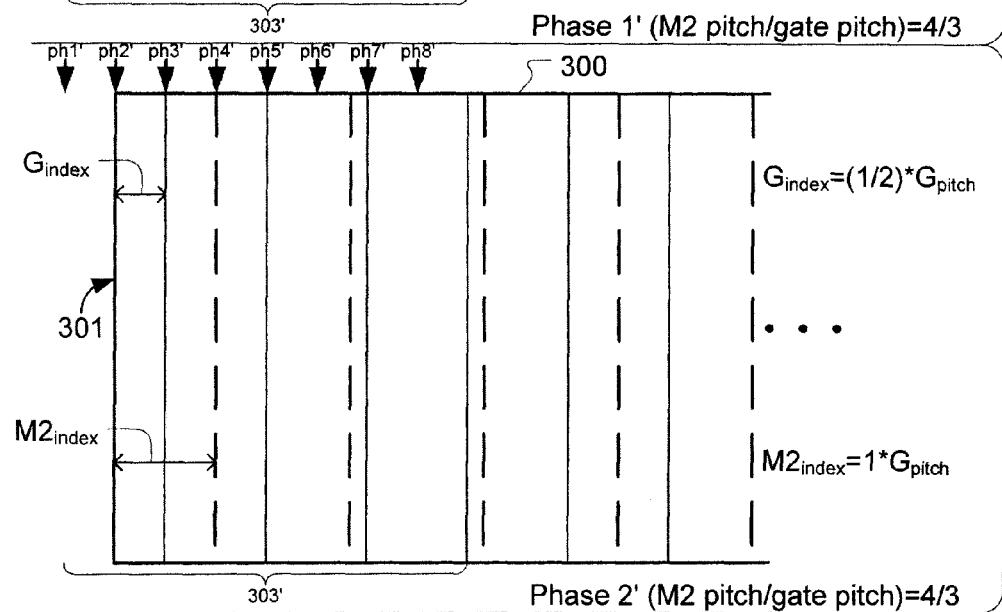
Figure 3K:
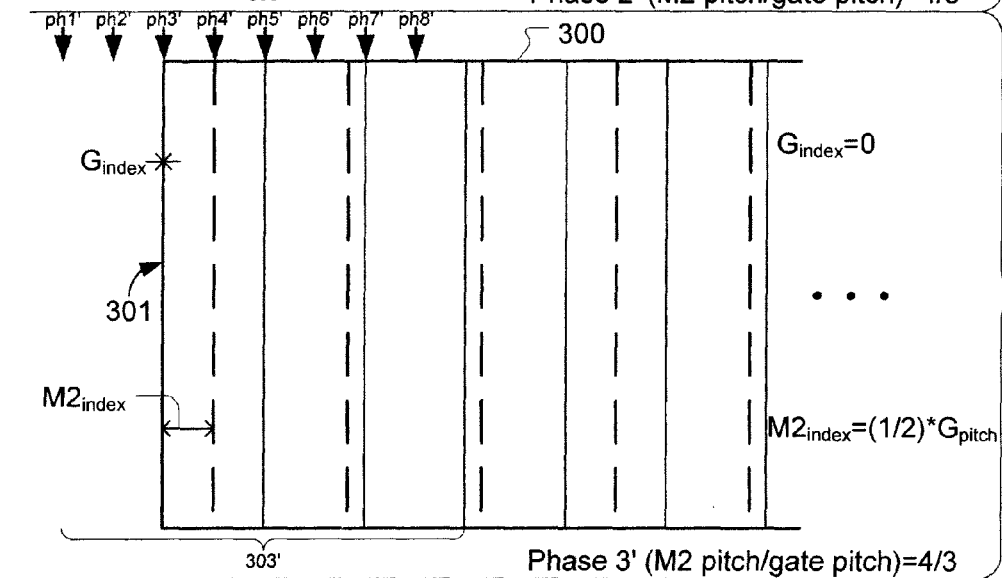
Figure 3L:
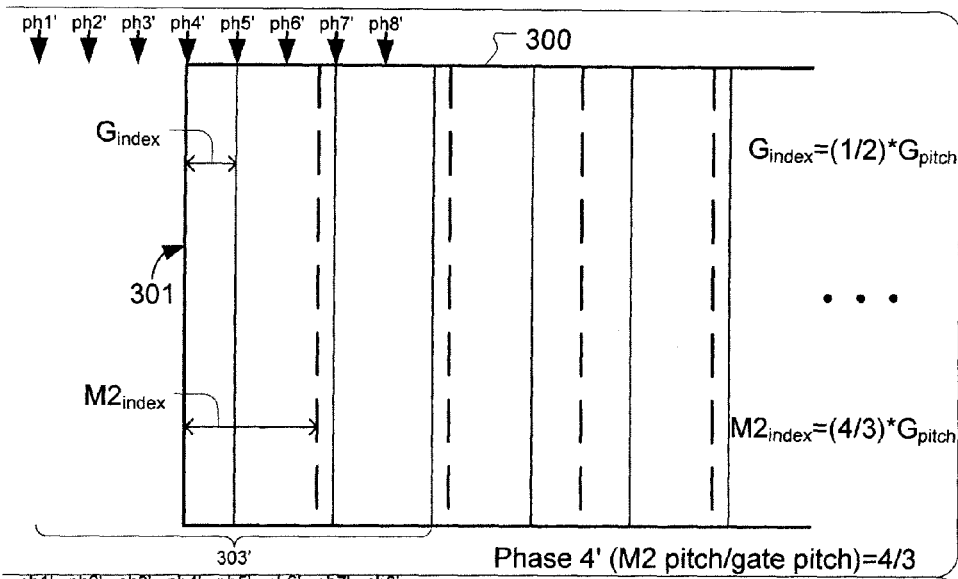
Figure 3M:
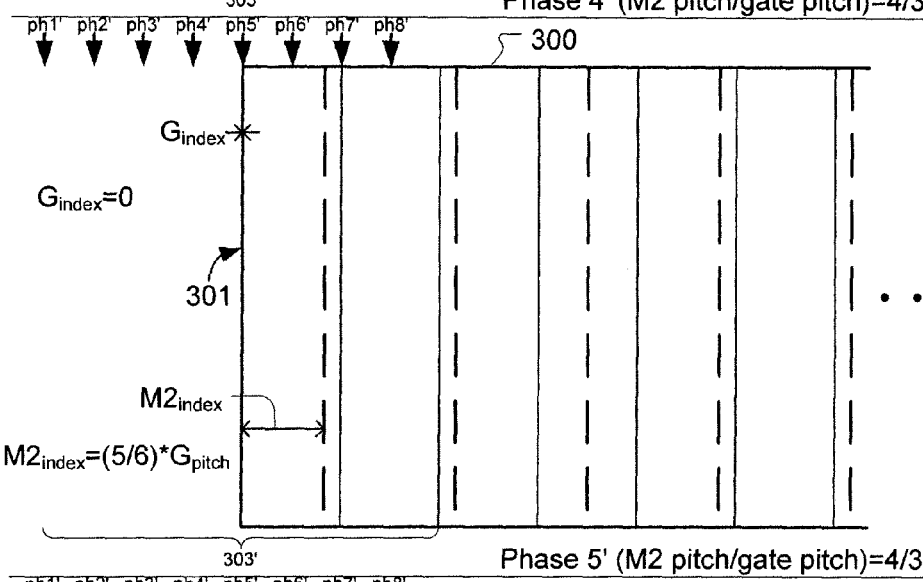
Figure 3N:
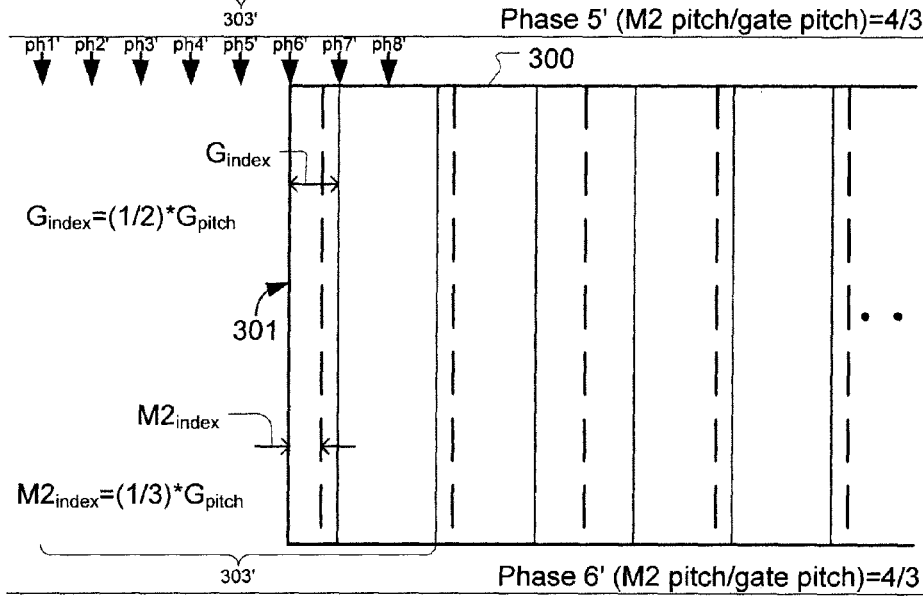
Figure 3O:
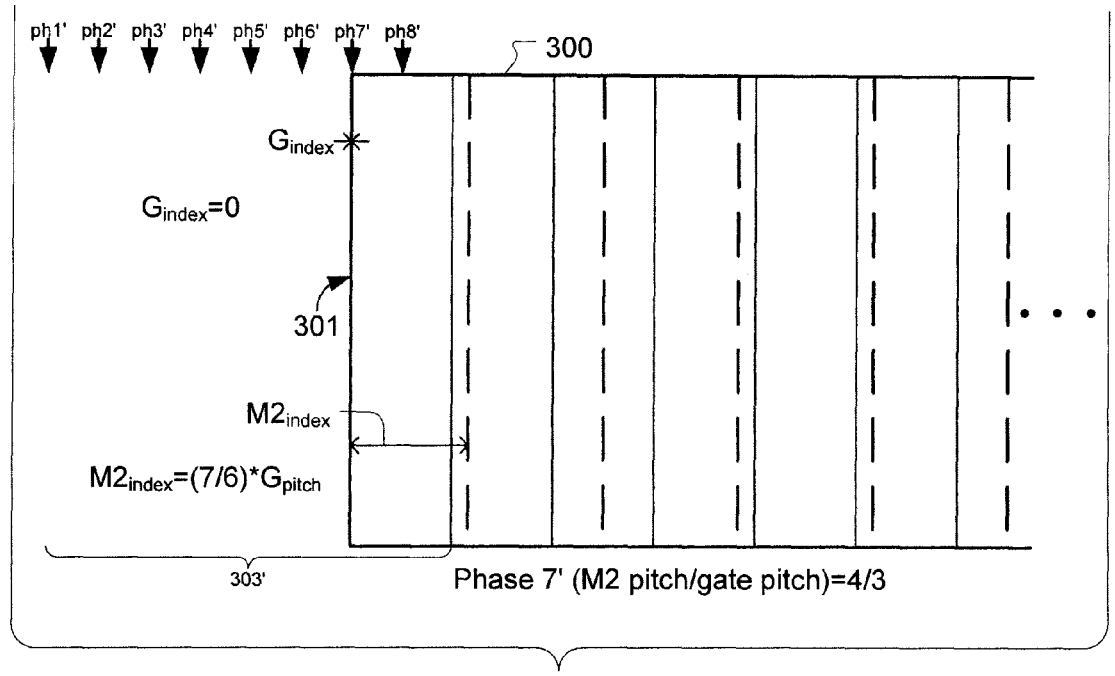
Figure 3P:
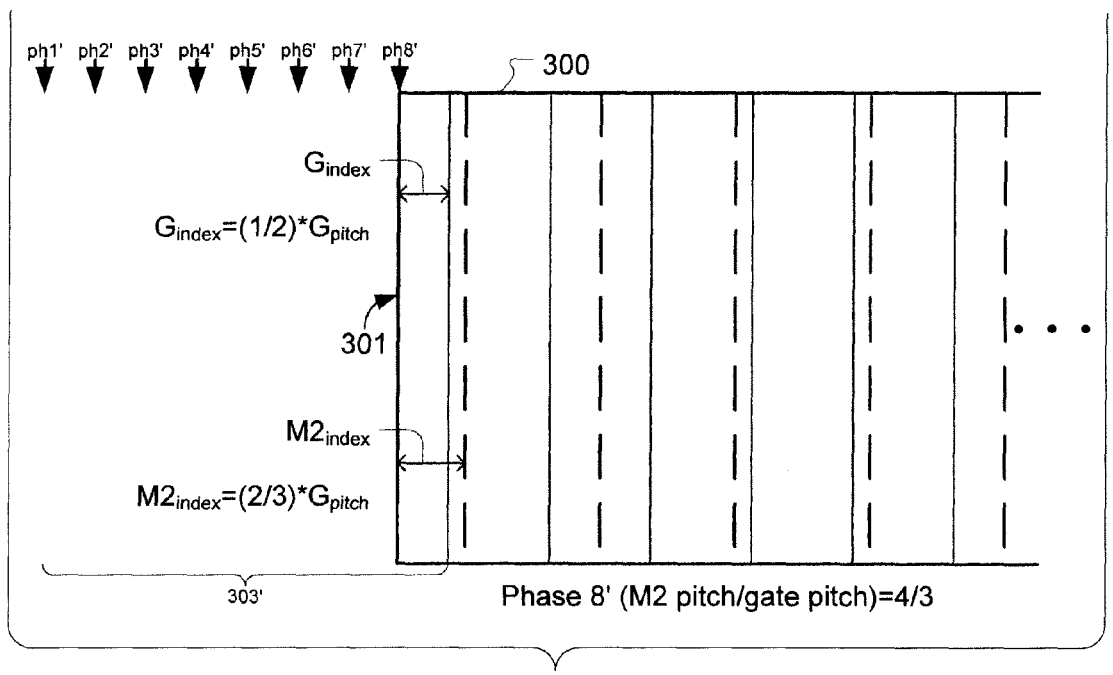

Following the operation 505, the method proceeds with an operation 507 in which the left boundary of the cell is moved from its current position across the phase space to a next possible location of the left boundary of the cell within the phase space. It should be understood that the left boundary of the cell is moved across the phase space in operation 507 without moving the virtual grates of the phased chip levels within the phase space. FIG. 3B shows an example of moving the left boundary 301 of the cell 300 from its current position (i.e., from its position in FIG. 3A) to the next possible location (ph2) of the left boundary of the cell within the phase space 303.

If the particular dynamic array architecture embodiment for the area of the semiconductor chip allows for cell widths that are an integer multiple of the gate level virtual grate half-pitch, then the possible locations of the left cell boundary within the phase space correspond to each gate level virtual grate line within the phase space and to each midpoint between each adjacent pair of gate level virtual grate lines within the phase space. This situation is exemplified in FIGS. 3A-3H. If the particular dynamic array architecture embodiment for the area of the semiconductor chip only allows cell widths that are an integer multiple of the gate level virtual grate (whole) pitch, then the possible locations of the left cell boundary within the phase space correspond to either a gate level virtual grate line or a midpoint between an adjacent pair of gate level virtual grate lines within the phase space.

With the left boundary of the subject cell aligned with the next possible location of the left boundary of the cell within the phase space, the method continues with an operation 509 for defining a next phase of the subject cell based on locations of the virtual grates of the phased chip levels relative to the left cell boundary. This next phase of the subject cell represents another variant of the subject cell that is suitable for placement on the semiconductor chip at a location where this next phase of a given cell is required. This next phase of the subject cell can also be characterized by index values for each phased chip level. Operation 509 includes storage of this next phase of the subject cell in the cell library for future recall and use.

The method then proceeds with a decision operation 511 for determining whether another possible location of the left boundary of the cell exists within the phase space. If another possible location of the left boundary of the cell does exist within the phase space, the method reverts back to operation 507. However, if another possible location of the left boundary of the cell does not exist within the phase space, the method concludes. Following completion of the method of FIG. 5, the cell library will include a variant of the subject cell for each possible cell phase that may occur within the area on the semiconductor chip defined according to the phased chip levels of the dynamic array architecture.

Figure 6:
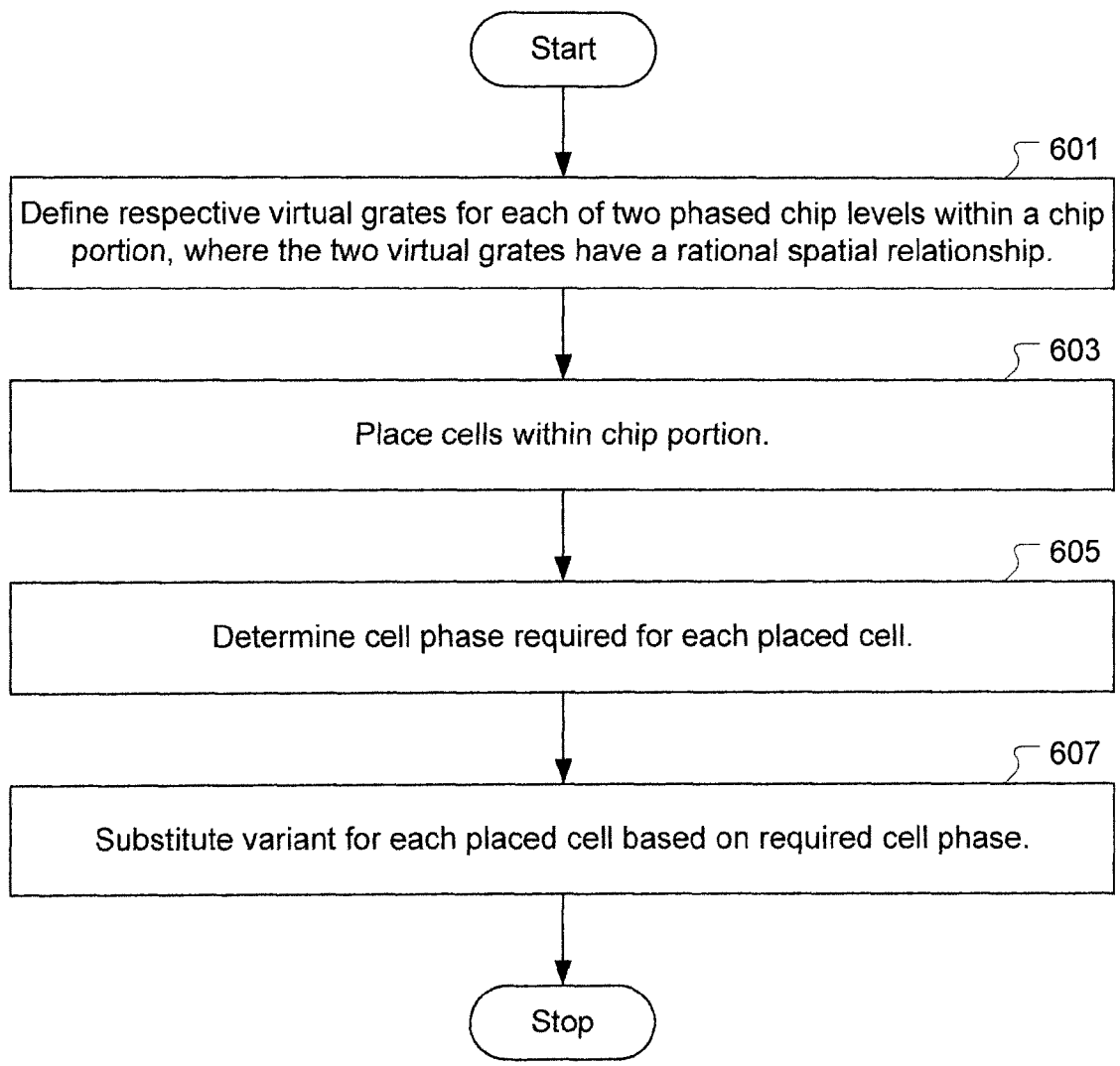
FIG. 6 is an illustration showing a flowchart of a method for placing cells within a portion of a semiconductor chip defined according to a dynamic array architecture, in accordance with one embodiment of the present invention.

FIG. 6 is an illustration showing a flowchart of a method for placing cells within a portion of a semiconductor chip defined according to a dynamic array architecture, in accordance with one embodiment of the present invention. The method includes an operation 601 for defining respective virtual grates for each of two phased chip levels within the portion of the semiconductor chip. The two phased chip levels are defined to have a rational spatial relationship. As previously discussed, two virtual grates that are commonly oriented, indexed to a common spatial location, and have the ratio of their virtual grate pitches defined by a rational number are considered to have a rational spatial relationship. In one embodiment, the two phased chip levels correspond to a gate level and a second interconnect level. However, it should be understood that in other embodiments, the two phased chip levels can correspond to any two chip levels.

The method then proceeds with an operation 603 for placing cells within the portion of the chip. In one embodiment, the two phased chip levels are indexed to a lower-left corner of the portion of the chip, and the cells are placed in rows extending from left to right across the portion of the chip. Also, in one embodiment, the cells can be placed such that their boundaries, which are commonly oriented with the virtual grates of the two phased chip levels, align with the half-pitch of the virtual grate of the phased chip level having the smaller virtual grate pitch.

The method then proceeds with an operation 605 for determining the cell phase required for each cell placed in operation 603. In one embodiment, the required cell phase for a given cell is identified by index values for the phased chip levels within the placed cell. Again, the index value for a given phased chip level within the placed cell is defined as the distance measured perpendicularly between the left boundary of the placed cell and the nearest virtual line of the given phased chip level's virtual grate within the placed cell, i.e., the nearest virtual line of the given phased chip level virtual grate that is to the right of the left boundary of the cell. Calculated index values for the phased chip levels of each placed cell can be compared to corresponding index values of variants of the same placed cell within a cell library to identify a particular variant of the same placed cell having the required cell phase. An operation 607 is then performed to substitute for each placed cell the particular variant of the placed cell that has the required cell phase, thereby causing the layout features in the phased chip levels of each placed cell to align with the virtual grates of the phased chip levels defined across the portion of the semiconductor chip.

Based on the foregoing, in one embodiment, a semiconductor chip is defined to include a logic block area. The logic block area includes a first chip level in which layout features are placed according to a first virtual grate. The logic block area also includes a second chip level in which layout features are placed according to a second virtual grate. A rational spatial relationship exists between the first and second virtual grates. A number of cells are placed within the logic block area. Each of the number of cells is defined according to an appropriate one of a number of cell phases. The appropriate cell phase causes layout features in the first and second chip levels of a given placed cell to be aligned with the first and second virtual grates as positioned within the given placed cell. It should be understood that a given cell defined in accordance with either of the number of cell phases is defined to perform a same logic function associated with the given cell. Moreover, in one embodiment, it is of interest to define each variant of a given cell, corresponding to the various cell phases, to have similar electrical characteristics. Also, in one embodiment, some of the number of cells include at least one layout feature placed in either the first chip level or the second chip level in a substantially centered manner along a cell boundary that is parallel to virtual lines of the first and second virtual grates.

In one embodiment, the number of cells are placed in rows within the logic block area, such that interfacing cell boundaries are co-aligned. Also, in one embodiment, a height of each of the number of cells is uniform. The height of each of the number of cells is measured in a direction parallel to virtual lines of the first and second virtual grates. Additionally, in one embodiment, a width of each of the number of cells is an integer multiple of a pitch of the first virtual grate, and each boundary of each placed cell (that is parallel to virtual lines of the first virtual grate) is aligned with a virtual line of the first virtual grate. In another embodiment, a width of each of the number of cells is an integer multiple of a pitch of the first virtual grate, and each boundary of each placed cell (that is parallel to virtual lines of the first virtual grate) is aligned with a midpoint between adjacent virtual lines of the first virtual grate. In yet another embodiment, a width of each of the number of cells is an integer multiple of one-half of a pitch of the first virtual grate, and each boundary of each placed cell (that is parallel to virtual lines of the first virtual grate) is aligned with either a virtual line of the first virtual grate or a midpoint between adjacent virtual lines of the first virtual grate.

Additionally, while the above-described embodiments are discussed within the context of phasing each cell placed within a given logic block, it should be understood that in an alternative embodiment, the cell phasing methods described herein may be applied to a portion of the cells placed within a given logic block, with a remainder of the cells in the logic block left unphased. For instance, if a first group of cells in a given logic block are defined according to the dynamic array architecture and utilize appropriate phasing when placed, and a second group of cells in the given logic block are defined by another architecture (i.e., non-dynamic array architecture) that does not utilize phasing, the first group of cells can be placed and phased in accordance with the methods disclosed herein, and the second group of cells can be left unphased.

As discussed in co-pending U.S. patent application Ser. No. 12/013,342, which is incorporated in its entirety herein by reference, a dynamic array section (DAS) is defined as a subdivision of dynamic array architecture in which the features present in each vertically delineated level of the subdivision are defined with consideration of other features in the subdivision according to a set of rules, wherein the rules are established to govern relationships between features in a given level of the subdivision and between features in separate levels of the subdivision. A DAS can be defined to occupy a substrate area of arbitrary shape and size. A DAS can also be defined to occupy an area of arbitrary shape and size above the substrate.

Also, as discussed in co-pending U.S. patent application Ser. No. 12/013,342, conductive features in a given level of a logic cell, i.e., in a given level of a DAS containing the logic cell, can be indexed relative to an origin of the logic cell. For example, the origin of the logic cell in a given level is considered to be located at a lower left corner of the logic cell when viewed in a direction perpendicular to the plane of the substrate. Because logic cell widths are variable, a logic cell boundary in the width direction may not always fall on a conductive feature pitch or half-pitch within a given DAS level. Therefore, depending on the origin of the logic cell relative to the virtual grate of the given DAS level, the conductive features in the given DAS level of the logic cell may need to be shifted relative to the logic cell origin in order to align with the virtual grate of the given DAS level when the logic cell is placed on the chip. As discussed above, the shifting of conductive features in a given level of a logic cell relative of the origin of the logic cell is called phasing. Therefore, phasing provides for alignment of conductive features in a given level of a logic cell to the virtual grate of the DAS for the given chip level, depending on the location of the origin of the logic cell. For example, in the case where the gate electrode virtual grate extends across logic cell boundaries, phasing may be required to maintain alignment of second interconnect level conductive features in a given logic cell to the second interconnect level virtual grate.

Figure 7:
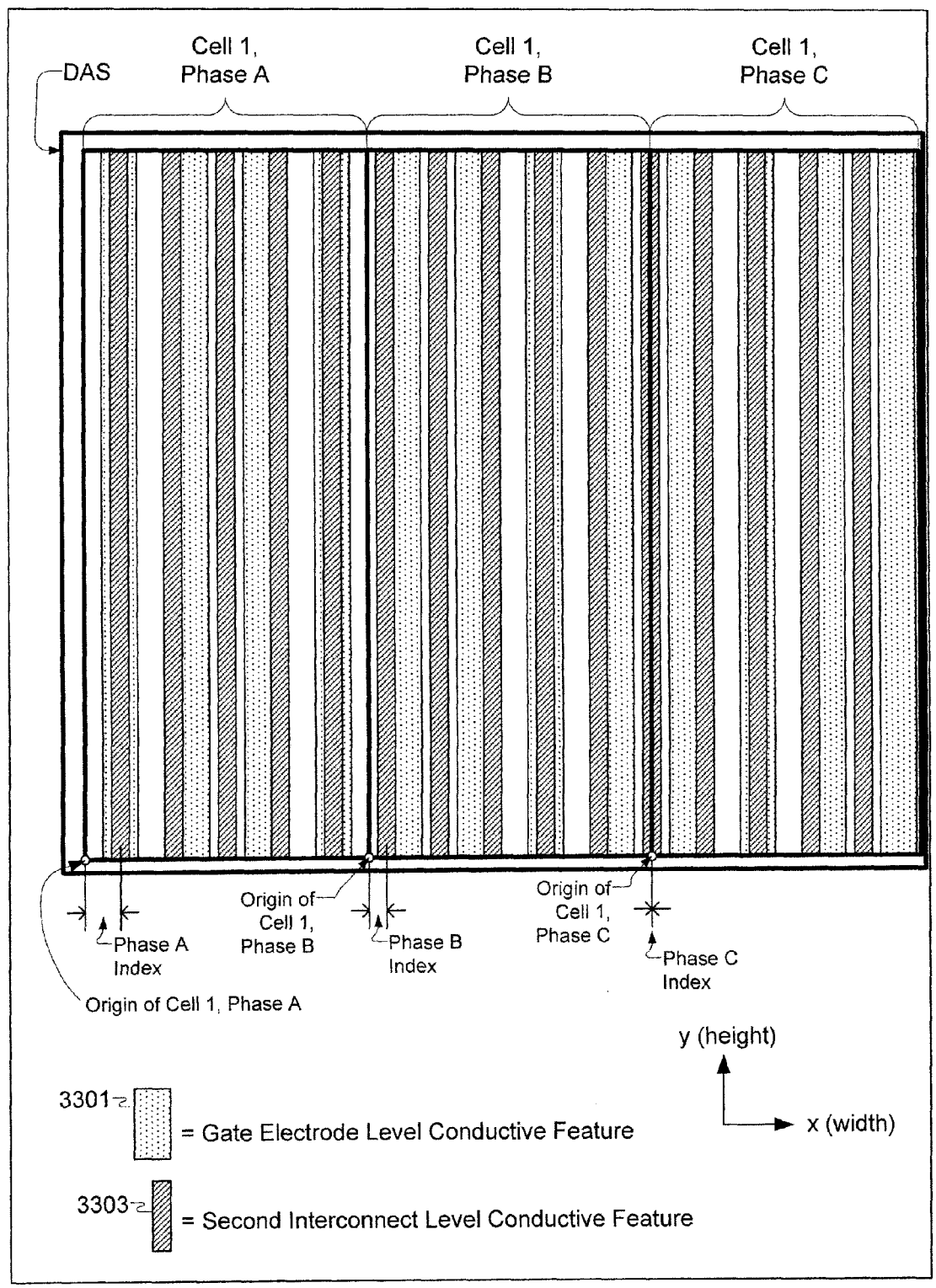
FIG. 7 is an illustration showing an example of different phasings in a second interconnect level of adjacently disposed logic cells defined within a DAS, in accordance with one embodiment of the present invention.

FIG. 7 is an illustration showing an example of different phasings in a second interconnect level of adjacently disposed logic cells defined within a DAS, in accordance with one embodiment of the present invention. FIG. 7 corresponds to FIG. 33 of co-pending U.S. patent application Ser. No. 12/013,342. FIG. 7 shows three exemplary cells (Cell 1, Phase A; Cell 1, Phase B; and Cell 1, Phase C) disposed adjacent to each other in a DAS. Therefore, each of the three cells share a virtual grate in each level of the DAS. To facilitate description of the phasing concept, the second interconnect level conductive features 3303 of each cell are shown superimposed over the gate electrode level conductive features 3301 of each cell. The cell boundaries in the width direction fall on the gate electrode half-pitch.

It should be understood that the M2 level-to-gate level virtual grate pitch ratio of 4/3 as used in the examples of FIGS. 2A-4 to illustrate the cell phasing principles is one example of many possible virtual grate pitch ratios that can be applied between different chip levels. For instance, in the exemplary embodiment of FIG. 7, an M2 level-to-gate level virtual grate pitch ratio of 3/4 is used, such that four second interconnect level conductive feature pitches are provided for every three gate electrode level conductive feature pitches.

The origin of each cell is shown to reside at the cell's lower left corner. Each phasing of Cell 1 for the second interconnect level is defined by an indexing of the second interconnect level conductive features to the origin of the cell. As shown in the example of FIG. 7, the index, i.e., spacing, of the second interconnect level conductive features relative to the origin is consecutively reduced for each of Phases A, B, and C. By defining each level of each logic cell to have an appropriate phase, it is possible to place logic cells next to one another in a common DAS such that conductive features defined within the various logic cells within a given DAS level can be aligned to a common virtual grate associated with the given DAS level. Additionally, it should be appreciated that in one embodiment adjacent cells within a DAS can be defined and placed so as to share conductive features in one or more levels of the DAS. For example, the Phase B and C instances of Cell 1 in FIG. 7 are depicted as sharing a second interconnect level conductive feature.

It should be understood that in some embodiments the dynamic array architecture may only be applied to a portion of one chip level, with overlying portions of other chip levels unconstrained with respect to dynamic array architecture restrictions. For example, in one embodiment, the gate electrode level is defined to comply with the dynamic array architecture, and the higher interconnect levels are defined in an unconstrained manner, i.e., in a non-dynamic array manner. In this embodiment, the gate electrode level is defined by a virtual grate and its corresponding feature layout channels within which gate electrode level conductive features are defined, as discussed above. Also, in this embodiment, the layout features of the non-dynamic array higher interconnect levels can be unconstrained with regard to a virtual grate and associated feature layout channels. For instance, in this particular embodiment, layout features in any interconnect level above the gate electrode level can include bends so as to form arbitrary two-dimensionally shaped layout features.

As an alternative to the above-mentioned embodiment, other embodiments can exist in which multiple chip levels are defined according to the dynamic array architecture. It should be understood that the phasing techniques disclosed herein are equally applicable to any embodiment that uses the dynamic array architecture, regardless of the number of chip levels that are defined according to the dynamic array architecture.

It should be understood that the cell phasing techniques as disclosed herein can be defined in a layout that is stored in a tangible form, such as in a digital format on a computer readable medium. For example, the cell phasing layouts as disclosed herein can be stored in a layout data file of one or more cells, selectable from one or more libraries of cells. The layout data file can be formatted as a GDS II (Graphic Data System) database file, an OASIS (Open Artwork System Interchange Standard) database file, or any other type of data file format suitable for storing and communicating semiconductor device layouts. Also, multi-level layouts utilizing the cell phasing techniques can be included within a multi-level layout of a larger semiconductor device. The multi-level layout of the larger semiconductor device can also be stored in the form of a layout data file, such as those identified above.

Figure 9:
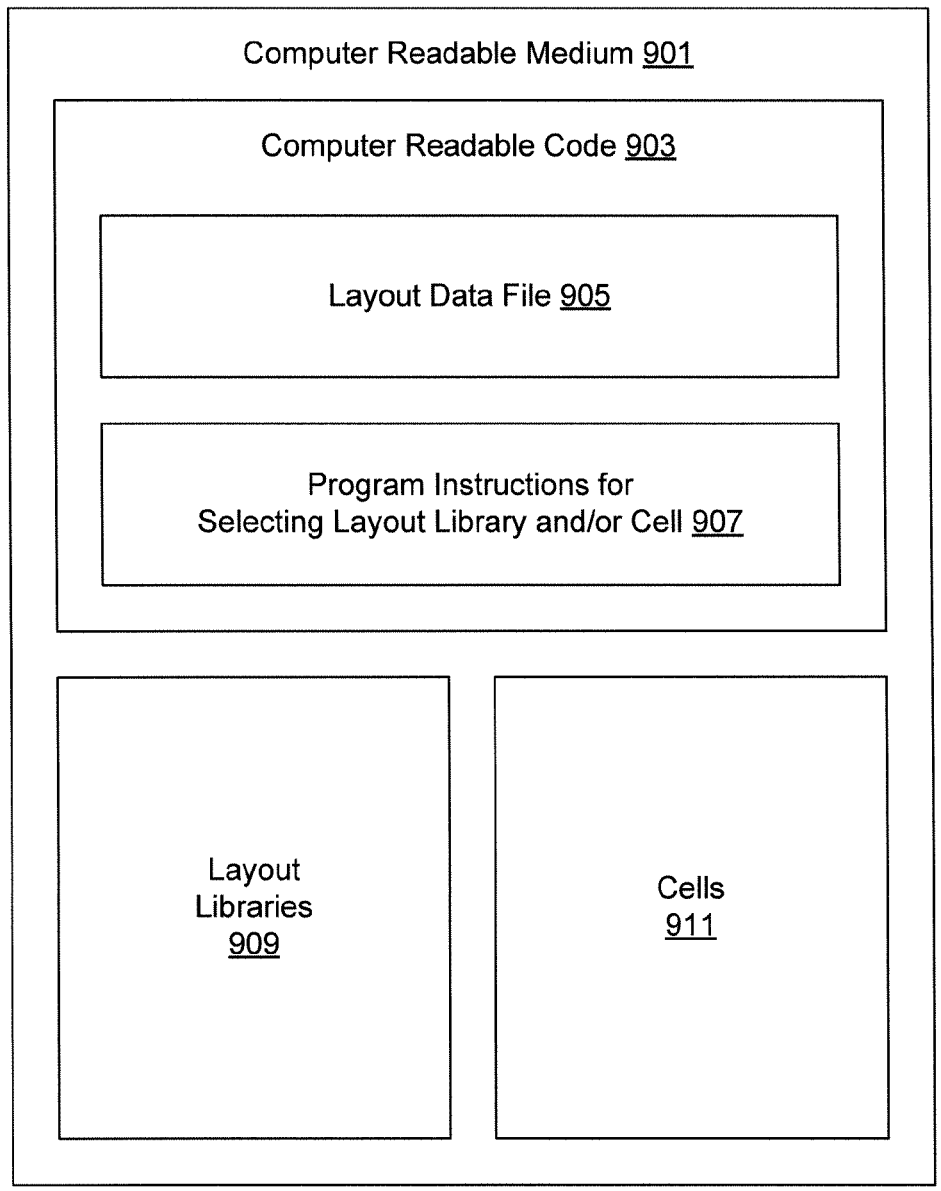
FIG. 9 shows a computer readable medium, in accordance with one embodiment of the present invention.

Also, the invention described herein can be embodied as computer readable code 903 on a computer readable medium 901, as shown in FIG. 9. For example, the computer readable code 903 can include the layout data file 905 within which one or more layouts including the cell phasing techniques are stored. The computer readable code 903 can also include program instructions 907 for selecting one or more layout libraries 909 and/or cells 911 that include a layout utilizing the cell phasing techniques as defined therein. The layout libraries 909 and/or cells 911 can also be stored in a digital format on a computer readable medium 901.

The computer readable medium mentioned herein is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

It should be further understood that the cell phasing embodiments as disclosed herein can be manufactured as part of a semiconductor device or chip. In the fabrication of semiconductor devices such as integrated circuits, memory cells, and the like, a series of manufacturing operations are performed to define features on a semiconductor wafer. The wafer includes integrated circuit devices in the form of multilevel structures defined on a silicon substrate. At a substrate level, transistor devices with diffusion regions are formed. In subsequent levels, interconnect metallization lines are patterned and electrically connected to the transistor devices to define a desired integrated circuit device. Also, patterned conductive layers are insulated from other conductive layers by dielectric materials.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A semiconductor chip, comprising:
a logic block area including a first chip level in which layout features are placed according to a first virtual grate, and a second chip level in which layout features are placed according to a second virtual grate, wherein a rational spatial relationship exists between the first and second virtual grates; and
a number of cells placed within the logic block area, wherein each of the number of cells is defined according to an appropriate one of a number of cell phases, wherein the appropriate one of the number of cell phases causes layout features in the first and second chip levels of a given placed cell to be aligned with the first and second virtual grates as positioned within the given placed cell.

2. A semiconductor chip as recited in claim 1, wherein the first virtual grate is defined by a first set of equally spaced, parallel virtual lines extending across the first chip level in the logic block area, and wherein the second virtual grate is defined by a second set of equally spaced, parallel virtual lines extending across the second chip level in the logic block area.

3. A semiconductor chip as recited in claim 1, wherein the rational spatial relationship between the first and second virtual grates denotes that the first and second virtual grates are commonly oriented, are indexed to a common spatial location, and have a ratio of their virtual grate pitches defined by a rational number.

4. A semiconductor chip as recited in claim 3, wherein the first and second virtual grates periodically align with each other according to the rational spatial relationship.

5. A semiconductor chip as recited in claim 3, wherein the first and second virtual grates do not align with each other in any of the number of cell phases.

6. A semiconductor chip as recited in claim 1, wherein a given cell defined in accordance with either of the number of cell phases is defined to perform a same logic function associated with the given cell.

7. A semiconductor chip as recited in claim 1, wherein the number of cells are placed in rows within the logic block area, such that interfacing cell boundaries are co-aligned.

8. A semiconductor chip as recited in claim 1, wherein a height of each of the number of cells is uniform, and wherein the height of each of the number of cells is measured in a direction parallel to virtual lines of the first and second virtual grates.

9. A semiconductor chip as recited in claim 1, wherein a width of each of the number of cells is an integer multiple of a pitch of the first virtual grate, and wherein each boundary of each placed cell that is parallel to virtual lines of the first virtual grate is aligned with a virtual line of the first virtual grate.

10. A semiconductor chip as recited in claim 1, wherein a width of each of the number of cells is an integer multiple of a pitch of the first virtual grate, and wherein each boundary of each placed cell that is parallel to virtual lines of the first virtual grate is aligned with a midpoint between adjacent virtual lines of the first virtual grate.

11. A semiconductor chip as recited in claim 1, wherein a width of each of the number of cells is an integer multiple of one-half of a pitch of the first virtual grate, and wherein each boundary of each placed cell that is parallel to virtual lines of the first virtual grate is aligned with either a virtual line of the first virtual grate or a midpoint between adjacent virtual lines of the first virtual grate.

12. A semiconductor chip as recited in claim 1, wherein each of the number of cell phases is defined by a first index value for the first chip level and by a second index value for the second chip level, wherein the first index value is equal to a first distance extending perpendicularly in a rightward direction from a left boundary of the given placed cell to a nearest virtual line of the first virtual grate, and wherein the second index value is equal to a second distance extending perpendicularly in the rightward direction from the left boundary of the given placed cell to a nearest virtual line of the second virtual grate.

13. A semiconductor chip as recited in claim 1, wherein the first chip level is a gate level of the chip and the second chip level is a second interconnect level of the chip.

14. A semiconductor chip as recited in claim 13, wherein the rational spatial relationship between the first and second virtual grates is defined by a virtual grate pitch ratio between the second interconnect level and the gate level of 3/4.

15. A semiconductor chip as recited in claim 1, wherein some of the number of cells include at least one layout feature placed in a substantially centered manner along a cell boundary that is parallel to virtual lines of the first and second virtual grates, and is present in either the first chip level or the second chip level.

16. A method for defining cell variants of different cell phase to enable placement of cells within a designated area of a semiconductor chip, comprising:
   a) identifying a phase space for the designated area of the semiconductor chip, wherein the phase space is defined as a distance extending perpendicularly between successive occurrences of a same relationship between the two virtual grates that have a rational spatial relationship within the designated area of the semiconductor chip;
   b) aligning a left boundary of a subject cell with a left edge of the phase space;
   c) with the left boundary of the subject cell aligned with the left edge of the phase space, defining a first phase of the subject cell based on locations of the two virtual grates relative to the left boundary of the subject cell;
   d) operating a computer to store the first phase of the subject cell in a cell library on a computer readable storage medium;
   e) moving the left boundary of the subject cell from its current position across the phase space to a next possible location of the left boundary of the subject cell within the phase space;
   f) with the left boundary of the subject cell aligned with the next possible location, defining a next phase of the subject cell based on locations of the two virtual grates relative to the left boundary of the subject cell;
   g) operating the computer to store the next phase of the subject cell in the cell library on the computer readable storage medium; and
   h) repeating operations e) through g) for each possible location of the left boundary of the subject cell within the phase space.

17. A method as recited in claim 16, wherein each of the two virtual grates is defined by a respective set of equally spaced, parallel virtual lines extending across a respective chip level in the designated area of the semiconductor chip.

18. A method as recited in claim 16, wherein the rational spatial relationship between the two virtual grates denotes that the two virtual grates are commonly oriented, are indexed to a common spatial location on the semiconductor chip, and have a ratio of their virtual grate pitches defined by a rational number.

19. A method as recited in claim 16, wherein a given phase of the subject cell represents a variant of the subject cell that is defined for placement in the designated area of the semiconductor chip where the given phase of the subject cell is required, and wherein each phase of the subject cell is defined to perform a same logic function associated with the subject cell.

20. A method as recited in claim 16, wherein each phase of the subject cell is characterized by a set of index values including a respective index value for each of the two virtual grates that define the phase space, where an index value for a particular virtual grate in a particular phase of the subject cell is defined as a distance measured perpendicularly between the left boundary of the subject cell and a nearest virtual line of the particular virtual grate within the phase space.

21. A method as recited in claim 16, wherein a set of possible locations of the left boundary of the subject cell within the phase space includes each allowable cell boundary position relative to one of the two virtual grates within the phase space.

22. A method as recited in claim 16, wherein a first virtual grate of the two virtual grates is defined for a gate level of the semiconductor chip, and wherein a second virtual grate of the two virtual grates is defined for a second interconnect level of the semiconductor chip.

23. A method as recited in claim 22, wherein the rational spatial relationship between the first and second virtual grates is defined by a virtual grate pitch ratio between the second interconnect level and the gate level of 3/4.

24. A method as recited in claim 16, wherein the cell library is stored in a digital format on a computer readable medium.

25. A method for placing cells within a designated area of a semiconductor chip, comprising:
   defining respective virtual grates for each of two phased chip levels within the designated area of the semiconductor chip, wherein the virtual grates of the two phased chip levels are defined to have a rational spatial relationship;
   placing cells within the designated area of the semiconductor chip;
   determining a required cell phase for each placed cell within the designated area of the semiconductor chip;
   for each placed cell within the designated area of the semiconductor chip, substituting a variant of the placed cell having the required cell phase, such that layout features in each of the two phased chip levels within the substituted variant of the placed cell align with the virtual grates of the two phased chip levels; and
   operating a computer to store the layout features in each of the two phased chip levels in a layout data file on a computer readable storage medium.

26. A method as recited in claim 25, wherein each of the virtual grates is defined by a respective set of equally spaced, parallel virtual lines extending across its corresponding phased chip level in the designated area of the semiconductor chip, and wherein the rational spatial relationship between the two phased chip levels denotes that the virtual grates of the two phased chip levels are commonly oriented, are indexed to a common spatial location on the semiconductor chip, and have a ratio of their virtual grate pitches defined by a rational number.

27. A method as recited in claim 25, wherein the two phased chip levels respectively correspond to a gate level and a second interconnect level.

28. A method as recited in claim 25, wherein the two phased chip levels are both indexed to a lower-left corner of the designated area of the semiconductor chip and have their virtual grates oriented to extend vertically across the designated area of the semiconductor chip, and wherein cells are placed in rows extending horizontally across the designated area of the semiconductor chip, such that a width of each cell is measured in a direction perpendicular to the virtual grates of the two phased chip levels.

29. A method as recited in claim 25, wherein the virtual grate of a lower of the two phased chip levels defines a base virtual grate, and wherein each cell is defined to have a width that is an integer multiple of a pitch of the base virtual grate, and wherein each cell is placed to have its cell boundaries that are parallel with virtual lines of the base virtual grate aligned with a midpoint between adjacent virtual lines of the base virtual grate.

30. A method as recited in claim 25, wherein the virtual grate of a lower of the two phased chip levels defines a base virtual grate, and wherein each cell is defined to have a width that is an integer multiple of one-half a pitch of the base virtual grate, and wherein each cell is placed to have its cell boundaries that are parallel with virtual lines of the base virtual grate aligned with either a midpoint between adjacent virtual lines of the base virtual grate or a virtual line of the base virtual grate.

31. A method as recited in claim 25, wherein the required cell phase for a given placed cell is identified by respective index values for the two phased chip levels, wherein an index value for a particular phased chip level within the placed cell is defined as a distance measured perpendicularly rightward between a left boundary of the placed cell and a nearest virtual line of the virtual grate of the particular phased chip level.

32. A method as recited in claim 25, further comprising:
for each placed cell, calculating index values for the two phased chip levels of the placed cell; and
comparing the calculated index values to corresponding index values of variants of the placed cell within a cell library to identify a particular variant of the placed cell that has matching index values, wherein the particular variant of the placed cell is substituted for the placed cell in the designated area of the semiconductor chip.

33. A computer readable storage medium, comprising:
a semiconductor chip layout recorded in a digital format, wherein the semiconductor chip layout includes a logic block area including a first chip level in which layout features are placed according to a first virtual grate, and a second chip level in which layout features are placed according to a second virtual grate, wherein a rational spatial relationship exists between the first and second virtual grates, and
wherein the semiconductor chip layout also includes a number of cells placed within the logic block area, wherein each of the number of cells is defined according to an appropriate one of a number of cell phases, wherein the appropriate one of the number of cell phases causes layout features in the first and second chip levels of a given placed cell to be aligned with the first and second virtual grates as positioned within the given placed cell.

34. A computer readable storage medium as recited in claim 33, wherein the digital format is a data file format for storing and communicating one or more semiconductor device layouts.

35. A computer readable storage medium as recited in claim 33, wherein the computer readable medium includes program instructions for accessing and retrieving the semiconductor chip layout or a portion thereof in the digital format from the computer readable medium.

36. A computer readable storage medium as recited in claim 35, wherein the program instructions for accessing and retrieving include program instructions for selecting a library, a cell, or both library and cell including a selectable portion of the semiconductor chip layout in the digital format.

37. A cell library stored in a digital format on a computer readable storage medium, comprising:
a plurality of cell layouts corresponding to different phases of a given cell, wherein the given cell includes at least one chip level in which layout features are placed in accordance with a virtual grate, wherein the virtual grate is defined by a set of parallel equally spaced virtual lines extending across the cell layout, and wherein each different phase of the given cell is defined by a different spacing between a reference cell boundary and a nearest virtual line of the virtual grate.

38. A cell library stored in a digital format on a computer readable storage medium as recited in claim 37, wherein any given layout feature placed in accordance with the virtual grate is defined within a feature layout channel that extends lengthwise along a given virtual line of the virtual grate and widthwise between neighboring virtual lines adjacent to the given virtual line.

39. A cell library stored in a digital format on a computer readable storage medium as recited in claim 38, wherein each layout feature defined within a given feature layout channel is prohibited from physically contacting any other layout feature defined within any other feature layout channel.

* * * * *